(12) United States Patent
Kaye

(10) Patent No.: US 6,208,348 B1
(45) Date of Patent: *Mar. 27, 2001

(54) SYSTEM AND METHOD FOR DIMENSIONALIZATION PROCESSING OF IMAGES IN CONSIDERATION OF A PEDETERMINED IMAGE PROJECTION FORMAT

(75) Inventor: Michael C. Kaye, Agoura Hills, CA (US)

(73) Assignee: In-Three, Inc., Agoura Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,746

(22) Filed: May 27, 1998

(51) Int. Cl.[7] .................................................. G06F 15/00
(52) U.S. Cl. ............................................................ 345/419
(58) Field of Search ................................... 345/419, 420, 345/418, 421, 422, 423, 424, 433

(56) References Cited

U.S. PATENT DOCUMENTS

| | | | |
|---|---|---|---|
| 3,621,127 | 11/1971 | Hope | 178/6.5 |
| 3,737,567 | 6/1973 | Kratomi | 178/6.5 |
| 3,851,955 | 12/1974 | Kent et al. | 352/60 |
| 4,017,166 | 4/1977 | Kent et al. | 352/57 |
| 4,021,846 | 5/1977 | Roese | 358/92 |
| 4,168,885 | 9/1979 | Kent et al. | 352/129 |
| 4,183,633 | 1/1980 | Kent et al. | 352/60 |
| 4,235,503 | 11/1980 | Condon | 350/1.2 |
| 4,436,369 | 3/1984 | Bukowski | 350/130 |
| 4,544,247 | 10/1985 | Ohno | 352/62 |
| 4,603,952 | 8/1986 | Sybenga | 352/65 |
| 5,002,387 | 3/1991 | Baljet et al. | 352/63 |
| 5,402,191 | 3/1995 | Dean et al. | 352/63 |
| 5,481,321 | 1/1996 | Lipton | 352/57 |
| 5,699,444 | 12/1997 | Palm | 382/106 |
| 5,742,291 | 4/1998 | Palm | 345/420 |
| 5,748,199 | 5/1998 | Palm | 345/473 |
| 5,929,859 | * 7/1999 | Meijers | 345/419 |
| 5,973,700 | * 10/1999 | Taylor et al. | 345/427 |
| 6,031,564 | * 2/2000 | Ma et al. | 345/419 |
| 6,088,006 | * 7/2000 | Tabata | 345/7 |
| 6,091,421 | * 7/2000 | Terrasson | 345/419 |

FOREIGN PATENT DOCUMENTS

WO 97/24000   12/1996   (WO).

OTHER PUBLICATIONS

3D Movie Magic Web Page Information, Jan. 21, 1998.
D. Kaufman, The Big Picture, Web Page for Xenotech, Apr. 1998.

* cited by examiner

*Primary Examiner*—Phu K. Nguyen
(74) *Attorney, Agent, or Firm*—Henricks, Slavin & Holmes LLP

(57) ABSTRACT

A system and method for DIMENSIONALIZATION processing of images in consideration of an image format includes an image monitor and a processor. The image monitor is adapted to generate visual displays which provide an interactive interface through which objects of a duplicated original image are selected and repositioned with object rendering tools to generate a complementary image, with the original image and the complementary image forming a left and right stereo pair suitable for three-dimensional projection. The system includes a result monitor which allows the resulting three-dimensional projection to be monitored in real time as objects or portions of objects in the complementary images are repositioned within the images. The processor of generates image data for a film recorder. The image data is generated in consideration of an image format wherein the left images are recorded in the film frames such that the resulting film is suitable for two-dimensional projection with a standard motion picture projector and wherein each right image is compressed and positioned within the same frame space as its corresponding left image.

30 Claims, 16 Drawing Sheets

DIMENSIONALIZE WORKSTATION 104 106 108 110

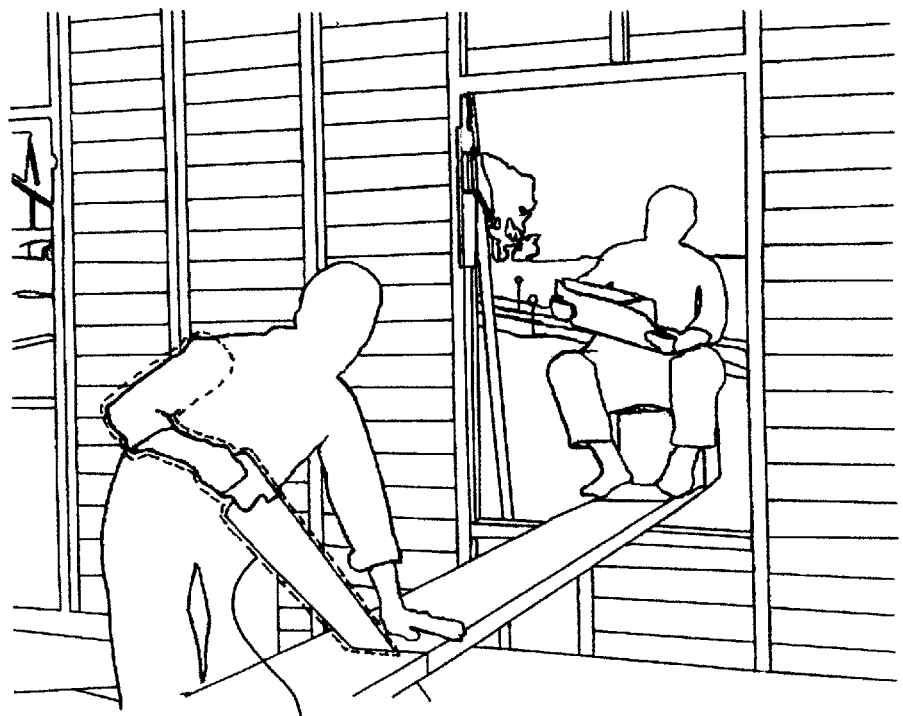
116  Fig. 3G
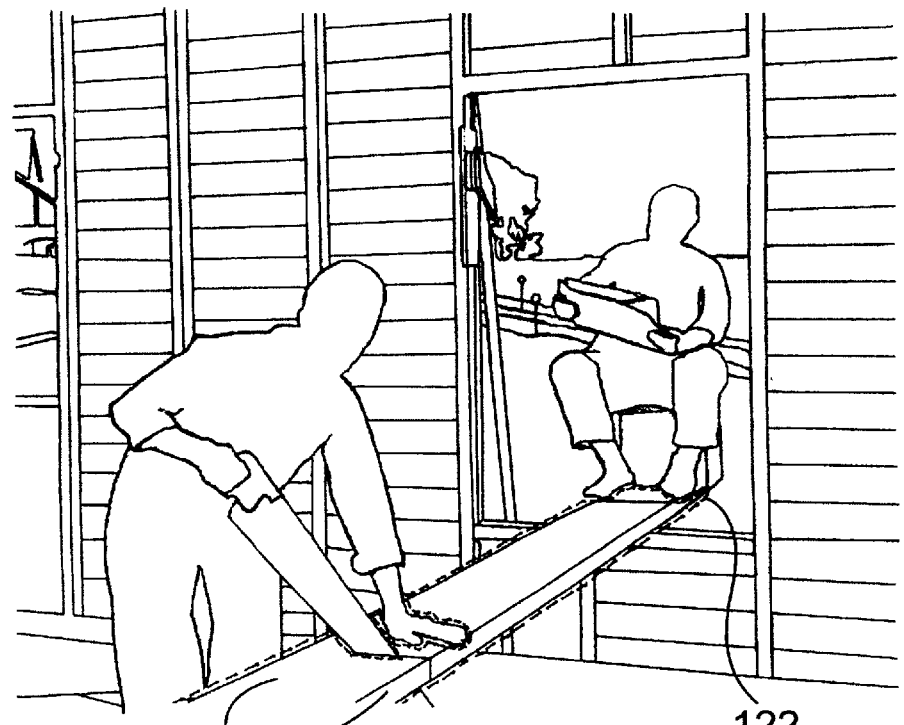
118  120  Fig. 3H  122

POSITION

SKEW

BEND

STRETCH

STRAIGHT
BULGE

SPHERICAL
BULGE

CONE
BULGE

CORNER
PUSH

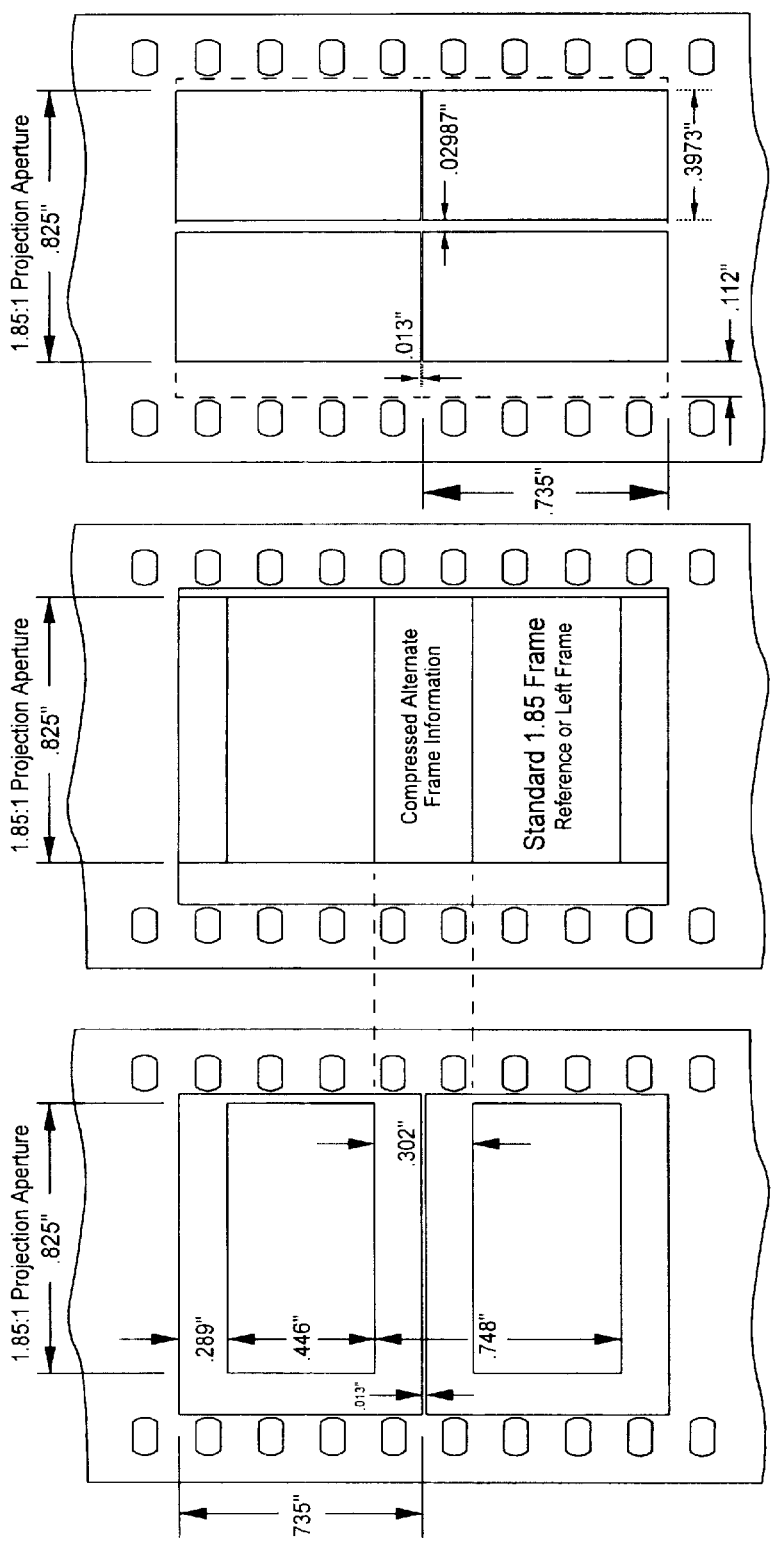

SYSTEM AND METHOD FOR DIMENSIONALIZATION PROCESSING OF IMAGES IN CONSIDERATION OF A PEDETERMINED IMAGE PROJECTION FORMAT

BACKGROUND OF THE INVENTION

1. Field of the Invention

The present invention relates to a system and method for processing two-dimensional images and, more particularly, pertains to a system and method for DIMENSIONALIZATION processing of images in consideration of a predetermined image projection format.

2. Description of the Related Art

While three-dimensional photography and software for manipulating images are known, the art of image projection is devoid of a system and method which is particularly adapted to converting two-dimensional images into a format suitable for three-dimensional projection and which provides user-friendly, interactive interfaces which allow for rapid selection of objects within images and efficient application of object rendering functions to the selected objects for the purpose of creating a stereo pair of left and right images for three-dimensional projection.

SUMMARY OF THE INVENTION

Three Dimensional Imaging

The term 3D is now a commonly used term adopted by the computer graphics world, which actually refers to computer generated images that show height, width, and depth viewed in two dimensions. Prior to the advent of 3D graphics, the term 3D suggested the viewing of images whereby depth is perceived. To avoid confusion, the term 3D in this patent application refers to the reproduction of moving images in such a way that depth is perceived and experienced by the viewer.

There are two very fundamental types of 3D images, stereoscopic and auto-stereoscopic. The term stereoscopic imaging refers to each eye being presented with an image both from one fixed related angle of view. Each image, although very similar, is from a different horizontal angle of view of only 2.5 to 3 inches. This is merely a recreation of the two images presented to our brain for depth perception in the real world. If an image is viewed with only one eye, or if both eyes receive the same information, the brain loses its ability to perceive depth.

When viewing television, movies, photographs, or even a painting on the wall, both eyes see the same information and the experience of reality is lessened as depth and dimension have to be imagined.

Auto-stereoscopic refers to images presented to each eye with one major difference; there is no fixed angle of view. As you move from left to right of the image, the perspective changes. One sees a different angle of view, which will be referred to as the "look around effect". This is the same effect as when viewing a hologram, although holographic technology at present has far greater unusable restrictions to be used for full color motion applications. The major advantage of auto-stereoscopic viewing is that it does not require special eyewear in order to differentiate between left and right eye images. Instead, the three-dimensional image is a result of a simulated parallax effect produced by a range of simultaneous multiple available viewing angles as compared to just two separate left/right images as with stereoscopic imaging.

Although auto-stereoscopic will be the next natural progression in image technology after stereoscopic 3D, it is actually much more difficult to implement since it requires the simultaneous availability of multiple images containing different viewing angles. The quality of the 3D effect with auto-stereoscopic imaging is also dependent on the high number of available images, or angles of views available.

Some desirable benefits to viewing images in 3D include the fact that ordinary images tend to become much more interesting to view. The reproduction of depth causes one to be drawn to detail in a way that ordinarily would not occur.

The Dimensionalize Process

The term Dimensionalize Process describes and defines the method of converting standard two-dimensional images to 3D according to the present invention. The process fundamentally involves scanning images into a computer based system and, with the use of graphic image software and specialized custom software, creating a three dimensional image that can then be used for viewing and for re-recording for three dimensional viewing.

A three dimensional stereoscopic image is composed of two images, a left and right angle of view simulating the natural stereoscopic distance of our eye separation. The Dimensionalize Process defines the original image as the reference, or left image. The right image starts off as being a duplicate of the reference (left) image but is to become the newly rendered image.

The fundamentals for Dimensionalizing images are to first establish the center, background, and foreground objects and subjects for dimensional placement. Graphic Image software may be used for placement and manipulation of the subjects or objects within a scene or image. Objects or subjects are defined typically by a person, who will be referred to as the Dimensionalist. The Dimensionalist is a person who has the artists' task of drawing around the subjects or objects within the picture. Those identified objects will later be given depth by placing them forward and backward within the image. The Dimensionalist draws around objects thereby establishing "user definable" areas or regions.

It would be desirable to have a system including a computer with high-speed decision-making capability of recognizing picture content. Only then, with such an intelligent super computer would the human not have to take the time to identify and draw around objects. Unfortunately, even with technology as it is in 1998, software to accomplish such a task does not yet exist. The properties that make up an object in an image or scene are too complex for a computer to have the ability to recognize picture content and isolate objects and subjects within a scene. There is not enough definable information whereby software can differentiate between all the image variables that contribute to that particular object or subject within a scene. In other words, if a scene contains a bunch of bananas in the foreground against a yellow background, the brain has a rather unique ability to recognize the bananas at all angles and lighting variations. Technology has not yet evolved to the extent that software has the ability for object and subject recognition.

There are some useful tools that can help differentiate certain values within an image such as hue and saturation of a color, or its brightness value. Even though these tools may be of use and may aid the process, a human must still be relied upon for the accurate determination of object identification.

The Process Involves the Following Steps

1. Transferring the film to a lower resolution for preview.
2. Scanning film pin registered at high-resolution (for example, 3700×2000 pixels) into high-density storage master files.
3. Creating a tape backup of the high resolution scanned images.

4. Creating a lower resolution duplicate file for speed of color correction. (1024×553).

5. Color correcting the lower resolution file and memorizing those corrections.

6. Applying the memorized color correction decisions to the high-resolution image files.

7. Filter Management—Applying filter corrections.

8. Copying the high-resolution image files for the processing of the right half of a 3D pair of images.

9. Playing the images, for example, 1024×553 pixels at 24 fps into a 120 hz monitoring system.

10. Object Assignment & Management—Drawing around objects and creating an Object Assignment Log.

11. Depth Management—Creating a Depth Assignment Log.

The Pre-Dimensionalize Process
Scanning the Film to Digital Storage

Film images must first be scanned on a high quality motion picture film scanner. Each film frame must be pin registered in order to obtain the maximum image stability as possible. If the film images are not pin registered and moving around, the Dimensionalizing process will be enormously aggravated while trying to isolate objects and subjects from frame to frame. Additionally, if the frames are "weaving" left to right the end result 3D effect will be further reduced.

The film images are scanned at a sufficiently high resolution so that there is little or no apparent loss in resolution once the images are eventually re-recorded back onto new film stock, or reproduced by direct electronic projection.

The most common motion picture aspect ratio is 1.85 to 1. Although most modern film scanners adequately scan and re-record images at 2,000 by 2,000 pixel resolution, the 1.85 aspect ratio frame is such that the vertical resolution is actually 1300 pixels from top to bottom, with the remainder of pixels being discarded in order to conform to the 1.85 to 1 aspect ration. It is desirable to scan a film with as much pixel resolution as possible and practical. The drawback for increased pixel resolution is the file size for each scanned image. As the pixel resolution increases, the size of the image file increases. In order to obtain a vertical resolution of 2000 pixels, 3700 pixels would be required in the horizontal domain. A more practical resolution size for scanning a 1.85 to 1 frame is 3000 pixels across by 1622 pixels top to bottom.

It may be desirable to telecine transfer the film to a convenient format for previewing the amount of work required for the Dimensional project for that particular film project.

Backing Up the Stored Image Data

The process of scanning each film frame to high quality, high-resolution digital data can be a very time consuming process due to the file size and the transfer of large amounts of data. The preferred film element to be scanned is the negative film element, as it contains more image information than a projection print. It is also likely that image information may end up compressed during the process of printing to another high contrast release print stock. It is always desirable to handle film elements as few times as possible as dirt is typically a concern with film transfers, especially with negatives. Therefore, once the film is scanned to digital data an immediate backup of the image files should be made as to not have to go through the entire process of re-scanning the film again if anything should happen to the original data.

Duplicating to a Lower Resolution Image Size

Another copy of the images may be made at a lower resolution. The processing time for color correction and the actual Dimensionalize process itself may be reduced significantly making it much more efficient by working with smaller file sizes. The Dimensionalize Process will be in a real time three-dimensional stereoscopic working environment. This simply means that the Dimensionalist will have the unique ability to actually see and determine the placement depth of those selected objects and subjects while viewing the scenes. It is therefore necessary to present these images in a practical resolution form to the Dimensionalist's workstation monitor. A practical high enough resolution size for the workstation may be 1024 by 553 pixels, in a 1.85 to 1 aspect ratio.

The Dimensionalize process utilizes a translation process that stores all of the parameters and actions made to the lower resolution image frames and translates and defers them to a second processing system that can automatically apply to all of the previously stored parameters to the high resolution images.

Color Correction

Each frame that makes up the motion picture image has been scanned and stored in a high-density digital storage system. The images must be color corrected prior to the separation of images for three-dimensional rendering. Color correction is accomplished by the use of both hardware and software. Color correction with this process is sped up by performing the corrections on the lower resolution images while recording the parameters and translating those parameters applying the correction decisions to the high-resolution images. In this way the processing time may be deferred and automatically carried out on the high-resolution images while the operator is busy color correcting the next scene or scenes.

Filter Management & Application

One of the advantages of digital imagery is the ability to apply image filters such as enhancements and film grain reduction that would not be possible otherwise. After the color correction decisions have been applied to the high-resolution images it may be desirable to apply varying levels of image enhancement to various frames or scenes. Although this may be monitored on the lower resolution format, results should be tested on the high-resolution images. Film grain reduction parameters may be viewed on the lower resolution images.

Pre-D Copying

A three dimensional stereoscopic image requires a pair of left and right images. The Dimensionalize process renders the right eye image out of a duplicate of the original. After the images are color corrected and enhanced the images need to be duplicated as pairs. One of those images is established as the reference "left" image. All software rendering re-creating the depth is made to the newly copied right image files. Adjustments to the reference images are no longer made.

The Dimensionalize Process
Object Management

The first step to Dimensionalizing an image is to establish and store all the user definable areas of each frame so they may be easily recalled from memory whether it is from hardware or software. Once the subjects are defined they may be recalled from one frame (or frame space) to the next. It should be noted that objects and subjects within a particular scene do not necessarily change frame-to-frame unless that scene contains very high motion content. It is not that high motion content does not exist; however, on the average, there is a much higher content of repetitive frame-to-frame image content. Therefore, the defined areas of objects or subjects may be carried or copied over from one frame to the next and then repositioned and modified for efficiency rather than having to redraw each and every frame from scratch. To redraw every image would be extremely tedious and take an extraordinary amount of time.

The defining process may be accomplished using the lower resolution images for increased speed. All object and subject defining parameters are recorded, translated, and applied to the high-resolution images. Processing time may again be deferred and automatically carried out on the high-resolution images thereby saving time.

An Object Assignment Log is created and maintained to keep track of objects and subjects within a scene and frames of a scene. The Object Assignment Log is used to assign depth placement values to the images.

Depth Management and Dimensional Logging

During the Dimensional Logging part of the process disclosed herein, the user defined areas of the objects and subjects are logged and recorded with their associated film frame numbers for recall. This is one of the ways in which objects can be tracked from frame to frame and from scene to scene. The Dimensionalist defines (draws) the objects for creating and maintaining a Depth Assignment Log due to the inherent complexity of object recognition. The Dimensionalist also determines the placement of depth of objects and subjects within a scene for the very same reasons.

Once the logging is complete, depth placement of objects and subjects may be performed. The way to cause an object to move away from the screen (i.e., away from the viewer) is to move the object within the right frame to the right of its corresponding object in the left frame. If the object in the right frame is in the same horizontal "X" pixel position as its complement in the left frame, the image will be at the same plane as the screen. If the object in the right frame moves to the left of its corresponding image in the left frame, the image will come out of the screen toward the viewer.

In addition to depth positional placement of objects it is also necessary to assign areas at any area of a selected object boundary whereby a dissolve will occur, at user definable pixel widths, across the selected object boundary from its assigned positional or depth algorithm to the adjacent positional depth algorithms surrounding that selected object. In other words, it is desirable to cause certain areas to gradually change from one depth assignment value over a number of predetermined pixels to another. The entire selected object boundary may be chosen, or a multiple section of that boundary may have assigned dissolve widths. With this method, we avoid having objects appear as "hard cutouts", instead they will appear to have more natural smooth transitions from front to back depth placement.

Scenes may be divided up into sections that contain similar object or subject positioning. Those scenes may be logged as "copy over" sections. Copy Over sections are sections whereby the depth placement of the objects or subjects from the first frame of a scene is copied over to subsequent frames that contain nearly the same object placement. The depth information that has been logged for the first scene must maintain its continuity throughout a scene otherwise the end result would show objects moving forward and back from the screen which would be a very undesirable effect.

The human element of the decision making process for determining the detail of objects and subjects and their subsequent placement of depth is very important to create an end result that appears real, as if the material were originally photographed in 3D.

Another important factor to the realization factor is the separation and placement of as many objects as possible and necessary. If a limited number of objects or subjects are placed in depth, an undesirable effect may occur hereinafter referred to as the "cardboard cutout effect". This is where a scene appears to be two dimensional with the exception of a few objects that appear to be placed forward or back as cutouts.

Reconstructing Depth

When objects are moved in and out of a scene they are repositioned on the horizontal X-axis of the image. Horizontal placement is typically done on a pixel by pixel basis as well as a sub-pixel basis. Although there is a correlation of depth and dimension to pixel placement, objects need to be monitored by the Dimensionalist for accuracy as there are too many variables affecting depth placement due to angles of the camera and angles of content within a scene.

When an objet or subject is moved to the left or right, a gap of information or hole exists in the area between the image and where the image used to be. This gap must not be visible for the appearance of visual continuity and realism. A method for alleviating this problem is to "pixel repeat" the information across the transaction areas of the objects. In other words, if an object is shifted 10 pixels to the left in a frame, the areas to the right of the frame must be repeated, or copied 10 pixels over as the image is now shifted in its position. Nothing needs to be done on the left side since the image has now covered up new areas of the pre-existing picture. If pixel placement is of a large displacement, there may need to be some touch up to the large transition areas as to not cause a 3D image disparity.

Pixel repeating requires that the defined objects and subjects that have been outlined extend slightly larger in the horizontal direction and in the opposite direction of the required directional placement. If the defined objects are not slightly oversized, tearing of the moving image may result causing a very undesirable effect. Extending the defined areas is accomplished automatically by a single selection that causes this function to occur.

In a preferred embodiment, the system according to the present invention utilizes software and hardware to cause multiple tasks to occur for the purpose of saving time in the lengthy process of logging and memorizing all of the depth and dimensional properties of scenes. Having software routines step through many levels of the process at high rates saves time in what otherwise would be a very lengthy process. An important part of the process is the uniqueness of having the ability to utilize the Dimensional Logging to assign depth values, process the images with those values, and view the result for the most Real Effect. If inaccuracies exist, the dimensional properties may be altered or modified and reapplied until the most real effect is achieved. That is one of the most important advantages of the Dimensional Process.

Real Time 3-D Monitoring

Unique to the Dimensionalize process is the ability to view the accuracy of the Dimensionalized frames in a real time 3-D environment while the objects or subjects are in the process of being placed.

Entire scenes may be tested for their accuracy and continuity by playing back and viewing the recorded 3D images of the film images at, for example, 24 frames per second. For example, at 24 fps, each left and right film frame is alternately displayed five times into a monitoring system being displayed at a 1024 by 768 lines at 120 progressively scanned frames per second. This may be accomplished by playing back the data representing 24 frames per second and alternately switching between the data of the right and left image until each film frame is displayed five times. If the original film frame rate happened to be 30 frames per second instead of 24, then the frames get repeated four times rather than five.

Correlation of Depth, Distance and Dimension

Viewing 3D images with continuous depth causes the viewer to be drawn to detail. For this reason, it is important to assign depth values of objects or subjects that accurately reconstruct the image as close as possible within a visually acceptable realm. Additionally, the more objects and subjects placed, the more real an image will appear, as if it were originally photographed in 3D.

Some images may be more difficult to Dimensionalize than others. Scenes that are typically easiest to Dimensionalize are those where the camera angle is such that objects are seen as a direct head on view against backgrounds with no apparent "Continuous Running Depth". An example of "Continuous Running Depth" is where you can actually see something continuously stretching its way from the foreground of the image into the background. In this situation, skewing may be appropriate to simulate the different dimensional properties of the re-created right camera view.

Camera angles dictate the complexity of the Dimensionalize process. The more complex the angle, the more complex the math for defining and assigning placement values representing depth and dimension.

The Dimensionalize Controller

The Dimensionalize Controller consists of two main sections. The first section is the Object Manager, which has the functions relating to the isolation, drawing, and memory management of those subjects or objects. The second part is the Dimensional Controller, which is for the management of assigning those objects or subjects dimension and depth.

The Object Manager

The Object Manager displays the picture frames and the selected objects in such a way that the process of drawing and manipulation of objects frame-to-frame can be done within a reasonable amount of time. With 1,440 frames for every minute of running time, at 24 fps, the process must be accelerated, otherwise, the time involved to Dimensionalize (i.e., to create a 3D image out of a 2D image) would be highly impractical and cost prohibitive.

The Process

It is not necessary to scan and store the entire length of the feature into storage at one time. The process may be accomplished in segments. Once the objects have been isolated and the dimension algorithms applied, the original material is no longer needed. The process involves the following steps once the film images have been scanned into digital storage:

1. Step 1. Initially playing and viewing images:

The images may be played and viewed on a separate monitor with the ability to vary the speed from normal 24 frames per second to rates slower or faster depending on the need. The ability to step frame one at a time is also essential to the operation as well as being able to step backwards in time or to accelerate ahead or back to a particular image frame.

2. Playing these images makes use of the lower resolution data files. 640×346 or 1024×553 may be used, assuming a 1.85 to 1 aspect ratio. It is imperative to visually see frames coming ahead in the process of previewing for what will be required for the isolation process. It is in this realm that the operator may choose to tag a series of frames whereby objects remain common enough across a multiple number of frames. One example of this may be where a "camera move" stops and there is little or no motion for several frames. Even if there is little motion it is much simpler and less time consuming for the operator to use the previously drawn areas and modify them as opposed to re-drawing around each and every frame.

The frames that have objects that are common over a plurality of frames we call "Views". The difference between a "scene" and a "view" is that a view has one particular camera angle that has little change of the bulk object or subject movement which is to be isolated for depth placement. A scene, on the other hand, is from one camera cut to another complete cut which may involve camera pans, zooms, and major subject and object movement. A scene is typically made up of multiple views. Once the series of frames are tagged as views, each of these views may be stored in visual registers above. In this way, it is easy to see at a glance the number of frames that make up that view. The number of frames that make up that view is displayed below each view frame. The picture displayed in the small thumbnail is the first frame of that view. If a scene cuts back and forth from one scene to another, known as A/B cuts, the views will be of great time reduction because all the operator has to do is to copy the object selections from one view to all the other common views rather than having to re-draw them. Although there may be a set number of views displayed on the screen at any one time in the Object Manager tool window, there are an unlimited number of views that may be accessed by merely grabbing and sliding left or right with the drawing pen anywhere within one of the view frames.

The time code for each view set of frames is always maintained even though it may not be displayed in the view thumbnail itself. If that view is pulled down to the operative frame display, the first frame of that view will now appear as the current view and on the full frame monitor.

2. Step. 2. Isolating Objects:

The operator will press Draw which commands the program to enter a drawing mode whereby a user definable area can be drawn. The operator draws around the object or subject. If the pen is moved away from the tablet, the defined area is not lost. When the operator is finished drawing around an object, Draw is pressed again releasing the pen from the drawn area. Undo takes the program back one step. Multiple areas can be drawn by just pressing Add and then continuing to draw around the next object. If an area around an object needs to be changed or removed, Subtract will allow the operator to remove unwanted drawn areas.

3. Step 3. Storing Objects:

After the objects that represent one position of depth have been drawn, the operator presses Store Next which stores those objects and their respective selected areas in the program and displays those objects in the first register of Current Frame Objects. If the operator wishes to place the object elsewhere, Store is pressed followed by the storage register of choice. Each time Store Next is selected again, the next available register will be used. This process will be repeated over and over for each new View frame.

4. Step 4. Recalling Stored Objects.

As an object moves from one frame to the next it may only require minor alteration to the drawn area and/or a reposition. The operator may chose to press Recall followed by the drawn area and/or a reposition. The operator may choose to press Recall followed by the previous frame object or drag the objects from the previous frame register to the Current frame register. When Recall is pressed, the selected area of those objects will be active and ready for further adjustment. The object may easily be repositioned to track the new position by grabbing the selection with the pen and dragging it to follow the new position for that frame. After adjustments are made, the image is stored by pressing Store Next or Store.

5. Step 5. Applying Selection Expansion Algorithms:

It may be necessary to apply expansion algorithms to the selected areas prior to storing. Objects that require position movements will need to have their drawn perimeters extend slightly outside in the opposite direction of the desired directional move since the edge pixels will be repeated. Pixel repeating is done to make up for the gap between where the object was and its new position. Again, when the object moves one way or another, there is a hole. Repeating edge pixels across horizontally will fill this hole. In nearly every situation this is more than an adequate compromising effect to allow the 3D effect to occur while virtually eliminating any visual discontinuity.

In accordance with a specific illustrative embodiment of the present invention, a system for DIMENSIONALIZATION processing of images in consideration of a predetermined image projection format includes: an image monitor adapted to generate visual displays in response to visual display control signals; and a processor adapted to generate the visual display control signals such that the visual displays prompt a user of the system to provide user inputs pertaining to an original image and a selected object within the image, and, in response to the user inputs, to generate a complementary image including a complementary object with at least a portion of the complementary object being repositioned within the complementary image as compared to a position of the select object within the original image.

In a further aspect of the present invention, the processor is adapted to generate the visual display control signals such that the visual displays provide an interactive interface through which the user of the system can associate a predetermined object rendering function with the selected object, and to reposition different portions of the complementary object within the complementary image depending upon the object rendering function.

In an alternative further aspect of the present invention, the processor is adapted to generate film recorder data pertaining to the original image and the complementary image, with the data being in a form usable by a mechanism for recording the original image and the complementary image onto film in consideration of a predetermined image projection format. In a further aspect of this system, the predetermined image projection format provides that a first sequence of original images are positioned on a film such that the original images can be projected by a motion picture projector configured to project motion picture film such as 35 mm, 65 mm, or 70 mm film and that a second sequence of complementary images are positioned on portions of the film not occupied by the first sequence of original images.

In another aspect of the present invention, a system for DIMENSIONALIZATION processing of images in consideration of a predetermined image projection format includes a data storage device upon which is stored a computer-executable program which, when executed by a processor in electronic communication with an image monitor, controls the processor to generate and provide visual display control signals to the image monitor such that the image monitor generates visual displays that prompt a user of the system to provide user inputs pertaining to an original image and a selected object within the original image, and, in response to the user inputs, controls the processor to generate a complementary image including a complementary object with at least a portion of the complementary object being repositioned horizontally within the complementary image as compared to a position of the selected object within the original image.

In another aspect of the present invention, a method for DIMENSIONALIZATION processing of images in consideration of a predetermined image projection format includes the steps of: providing an interactive video interface through which an operator can select objects within an original image and assign placement information to each of the objects; generating a complementary image identical to the original image except that portions of the objects are translated in position depending upon their placement information; and employing the interactive video interface in conjunction with a viewing device for alternately providing images to the left eye and right eye of the operator to view the original image with one eye and the complementary image with the other eye in real time as different placement information is assigned to an object.

In another aspect of the present invention, a system for DIMENSIONALIZATION processing of images in consideration of a predetermined image projection format includes: a data storage device upon which is stored a computer-executable program which, when executed by a processor, controls the processor to duplicate at least one image and create a second image from the at least one image for a three-dimensional image.

In another aspect of the present invention, a method for DIMENSIONALIZATION processing of images in consideration of a predetermined image projection format includes the steps of: scanning a motion picture film frame to generate image information; and processing the image information to create a right perspective frame as a complement three-dimensional frame of the motion picture film frame.

In another aspect of the present invention, a method for DIMENSIONALIZATION processing of images in consideration of a predetermined image projection format includes the steps of: duplicating at least one original image; creating a second image out of the original image, with the original image and the second image being a stereo pair for a three-dimensional image; and recording the second image along with its original image onto a frame space suitable for a three-dimensional projection.

In another aspect of the present invention, a method for DIMENSIONALIZATION processing of images in consideration of a predetermined image projection format includes the steps of: isolating and repositioning objects within a picture frame; creating a complement frame of the picture frame that simulates a different perspective angle of view than a prospective angle of view of the picture frame; and creating a three-dimensional image from the picture frame and the complement frame.

In another aspect of the present invention, a method for DIMENSIONALIZATION processing of images in consideration of predetermined image projection format includes the steps of: receiving picture information from at least one picture frame of a motion picture storage medium, such as film, with the picture frame embodying an original image; creating from the picture information a complement image representing a different perspective angle, or angles of view; and recording the complement image with the original image onto a storage medium.

In another aspect of the present invention, a method for DIMENSIONALIZATION processing includes the steps of: identifying objects within a series of images; and assigning depth placement values over a selected plurality of pixels of the images that include the objects, with the depth placement values varying over the selected plurality of pixels. In a further aspect, the width or shape of the gradual change area is varied over a selected number of pixels. In a further aspect, any portion of an object is independently changed with variable amounts of dissolve, or gradual change from one depth algorithm to another.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIGS. 3A–3H show an original image with various objects or portions of objects selected and outlined employing the system of FIG. 1;

FIG. 13 shows a section of 35 mm film, a 1.85 to 1 projection aperture, and a 0.825 inch×0.446 inch image area within a film frame;

FIG. 14 shows a film format A embodying an exemplary preferred image projection format according to the present invention;

FIG. 15 shows a film format B embodying a second exemplary preferred image projection format according to the present invention.

DETAILED DESCRIPTION OF THE PREFERRED EMBODIMENTS

Figure 1:
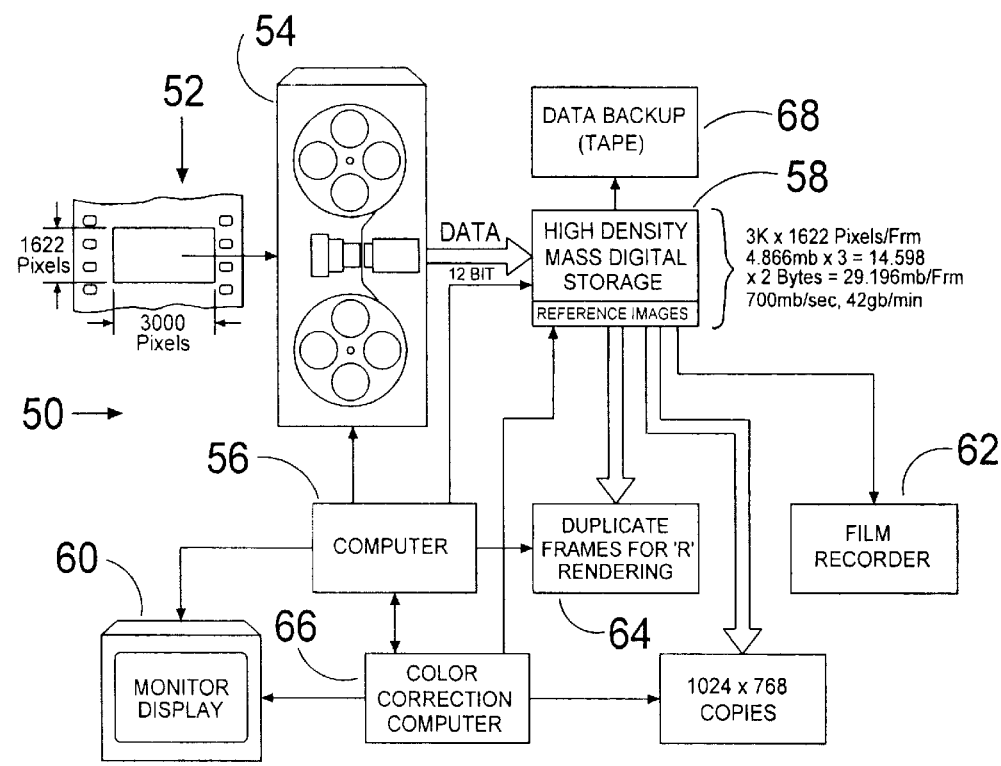
FIG. 1 shows components of an exemplary preferred embodiment of a system for DIMENSIONALIZATION processing of images in consideration of a predetermined image projection format according to the present invention.

FIG. 1 shows components of a system 50 for DIMENSIONALIZATION processing of images in consideration of a predetermined image projection format according to the present invention. The system 50 includes a source of two-dimensional images 52, such as 35 mm, 65 mm or 70 mm motion picture film, a scanner mechanism 54, a processor 56, data storage device 58, video monitor 60, and film recorder 62 interconnected as shown. Generally, original images are generated by the scanner 54 and stored in the data storage device 58. Block 64 conceptually illustrates that the scanned original images are duplicated by the processor 56 for rendering into complementary images. The system 50 may also, but does not necessarily, include a color correction processor 66 and a backup data storage device 68 connected as shown. While color correction is a step in an exemplary preferred DIMENSIONALIZATION process according to the present invention, a separate color correction processor 66 is not necessarily required. In other words, all processing can be performed by a single processor, by several processors, or by a combination of processors, firmware and hardware depending upon the specialized requirements of any particular system.

Figure 2:
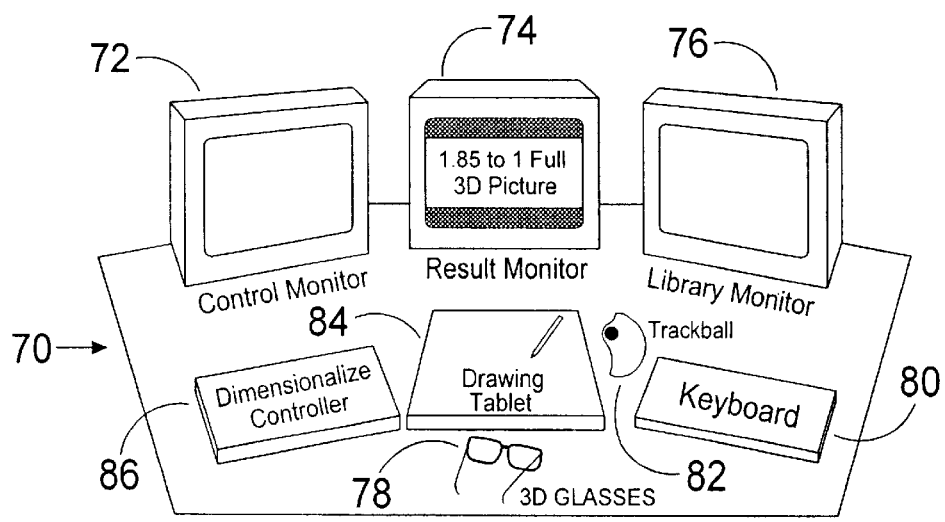
FIG. 2 shows a dimensionalize workstation of the system of FIG. 1.

The system 50 also includes a workstation 70, an exemplary preferred embodiment of which is shown in FIG. 2. A key aspect of the present invention is that one or several video monitors are employed to provide a user of the system 50 with an interactive interface through which a plurality of original images can be duplicated and rendered into a plurality of complementary images. More specifically, the interactive interface embodies a plurality of tools particularly adapted to facilitate rendering of the complementary images such that each resulting complementary image and its corresponding original image provide a stereo pair of images for a three-dimensional image.

As shown in FIG. 2, the workstation 70 comprises a control monitor 72, result monitor 74, library monitor 76, three-dimensional glasses 78, one or several user input mechanisms such as keyboard 80, mouse or trackball 82 and drawing tablet/pen assembly 84. The workstation also includes a controller 86 which is programmed to provide signals to the monitors 72, 74, 76, control the visual displays at these monitors, and receive and process user inputs provided to the system via the user input mechanism 80, 82, 84, i.e., control the interactive interface. The controller 86 is also programmed to control the rendering of the complementary images from the original images in response to inputs provided by the a user of the system 50. A key aspect of the present invention is that the controller 86 is also programmed to provide, in conjunction with the conventional three-dimensional glasses 78 which receive a synchronizing signal from the controller 86, a three-dimensional image at the result monitor 74 which is updated in real time thus allowing the user to observe changes in the depth or placement of various objects within the three-dimensional image. As described below in greater detail, the control monitor 72 is employed to display the original images and/or copies of the original images as they are rendered into complementary images. The controller 86 is programmed to allow the user to select objects within images and to horizontally reposition portions of these objects within the complementary image automatically via a plurality of interactive tools which include object rendering functions. It should be understood that the functions implemented by the controller 86 may be performed in part or entirely by the processor 56 shown in FIG. 1 or distributed among a plurality of processors to optimize system performance or accommodate other design objects and constraints.

Figure 3A:
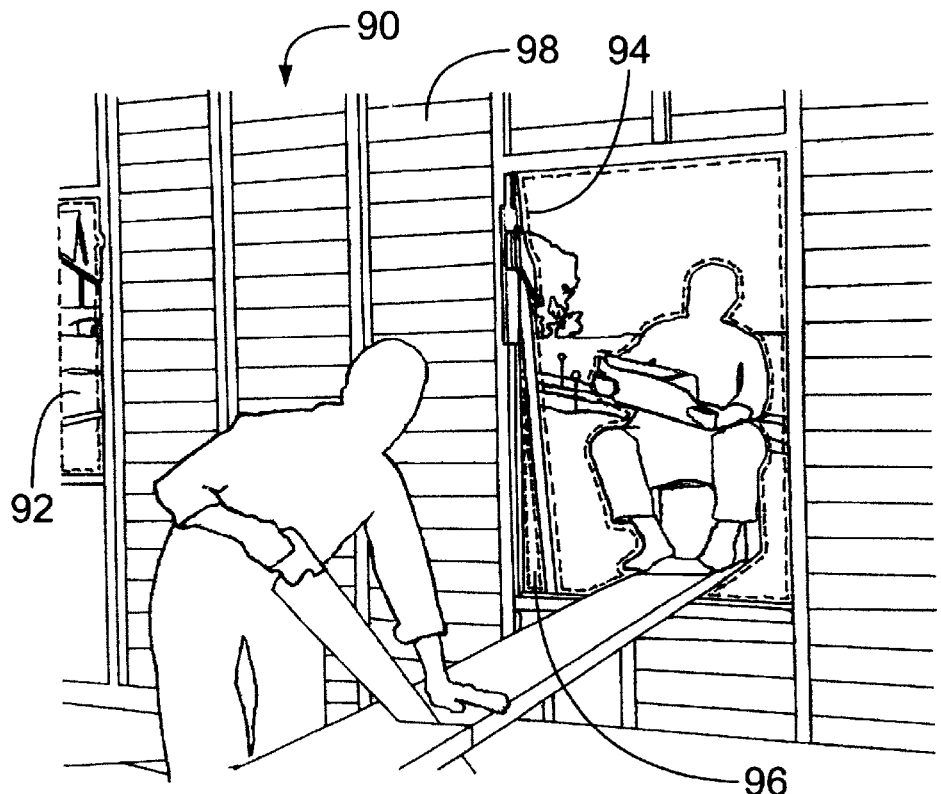

FIGS. 3A–3H show an original image with various objects or portions of objects selected and outlined employing the system 50. Referring to FIG. 3A, a user of the system 50 employs the drawing tablet and pen assembly 84 to outline with dashed lines, within duplicated original image 90, objects 92, 94, 96 which are further from the viewer than the building wall 98. Selected objects are repositioned horizontally within the duplicate image 90 depending upon their depth. At the present time, object recognition software does not exist which is sufficiently advanced to reliably automate the identification of objects within an image and the assignment of a depth placement or value to each identified object. However, and notwithstanding the plurality of interactive object rendering tools provided by system 50, it should be understood that the scope of the present invention additionally contemplates a system 50 wherein the processor 56 is programmed to process the digitized duplicate images to at least partially automate the identification of objects and assignment depth values to the objects.

Figure 3B:
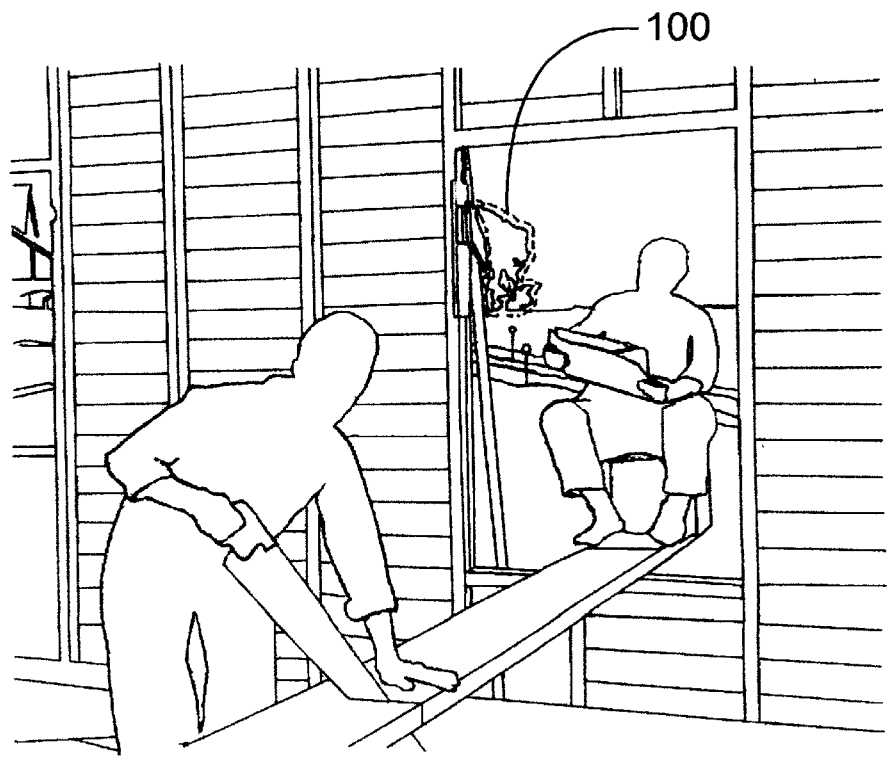
Figure 3C:
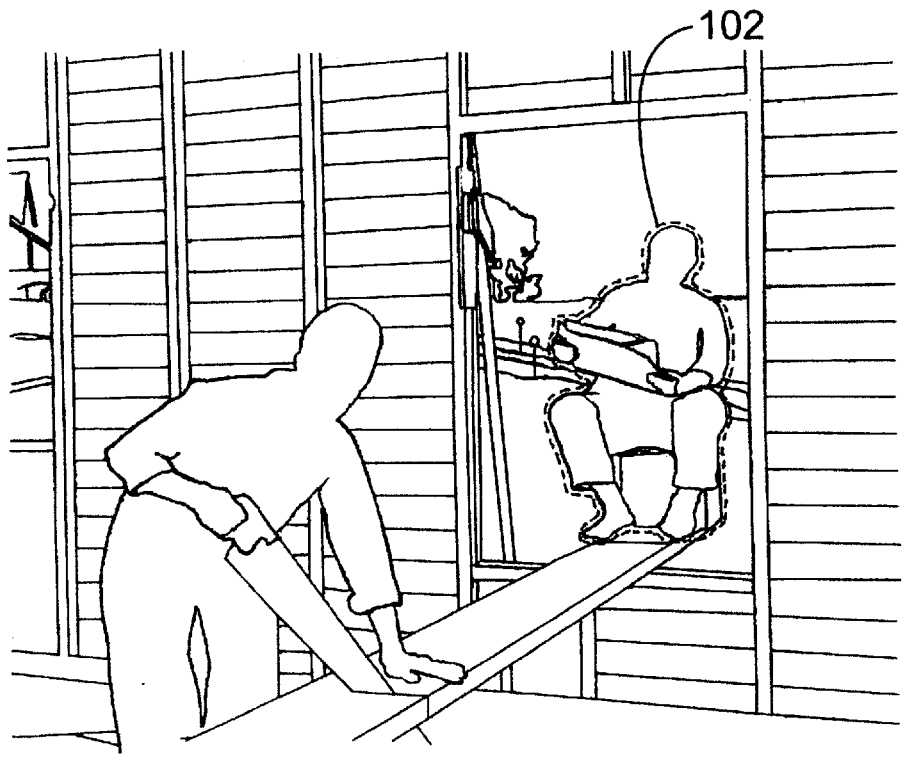

FIG. 3B shows a far object 100 which has been outlined. FIG. 3C shows an object 102 with a depth placement in between the wall 98 and the far object 100.

Figure 3D:
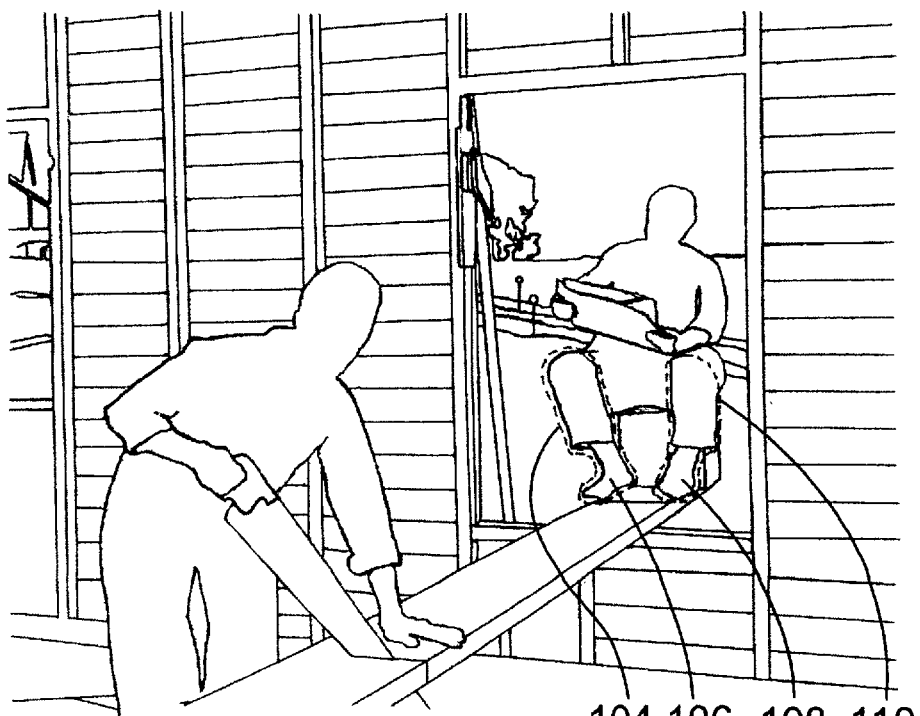
Figure 3E:
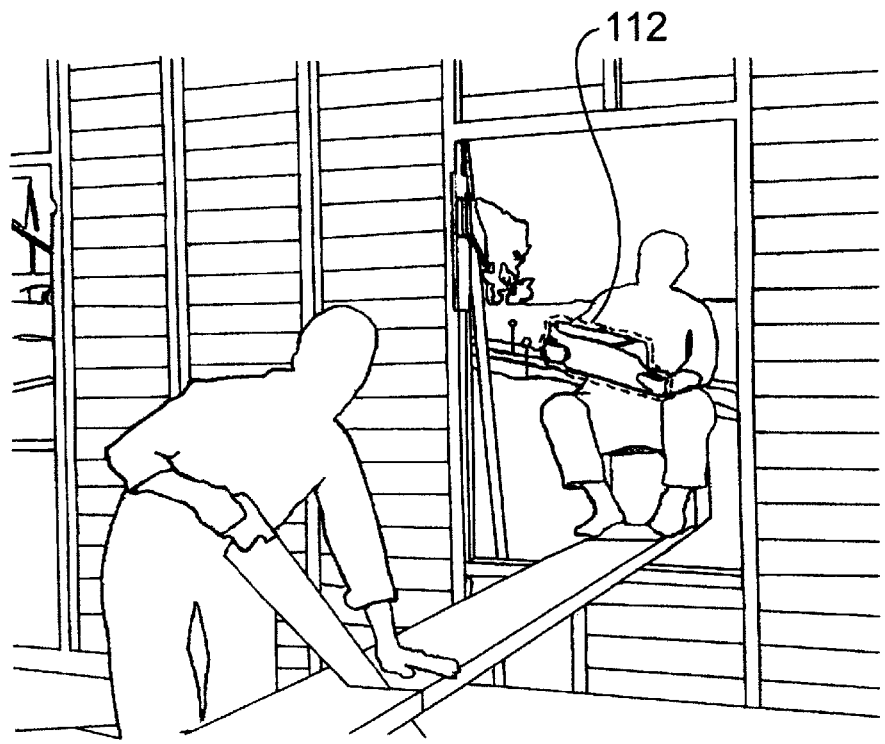

FIG. 3D illustrates another important aspect of the present invention, namely, that objects within other objects can be selected by the user. More specifically, FIG. 3D shows objects 104, 106, 108, 110 which are sub-objects of object 102 and which have depth placements in between the wall 98 and the object 102. This aspect is further illustrated in FIG. 3E which shows an object 112 which is also a sub-object of object 102 and which has a depth placement in between the objects 104, 106, 108, 110 and the object 102.

Figure 3F:
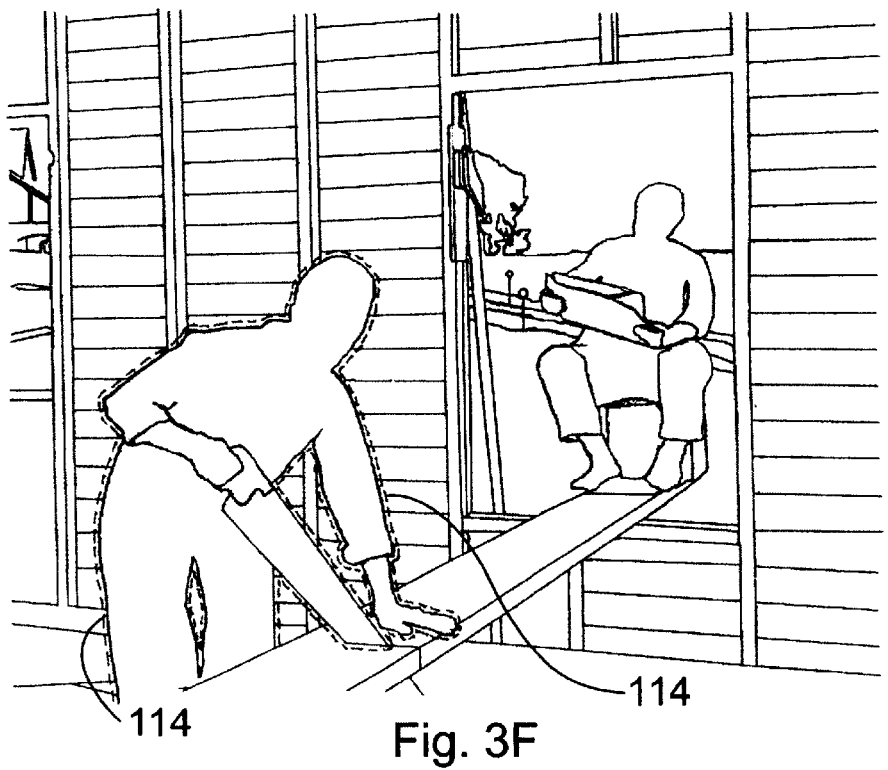

FIG. 3F shows a selected object 114 which is nearer to the viewer than the wall 98. FIG. 3G shows a selected object 116 which is a sub-object of object 114 and which is still closer to the viewer than the object 114.

A key aspect of the present invention is that the system 50 includes a plurality of object rendering tools that automate the horizontal translation of the selected objects and, more specifically, determine how far various portions of the selected objects are to be translated. This critical aspect takes into account the fact that many objects are not uniform in distance from the viewer throughout the object. For example, and as shown in FIG. 3H, object 118 varies in distance from the viewer from point 120 to point 122 according to a linear relationship. The system includes an object rendering tool adapted to automate the horizontal translation of portions of the object 118 between points 120, 122 according to a linear function. As discussed below, the system 50 also includes object rendering tools that apply other types of functions in translating horizontally portions of selected objects, e.g., sinusoidal and non-linear functions as well as functions that render a plurality of different surfaces within the selected object.

Figure 12A:
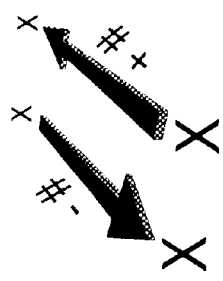
FIGS. 12A–12H conceptually illustrate exemplary preferred object rendering functions of the system for dimensionalization processing of images of FIG. 1.

FIGS. 12A–12H conceptually illustrate exemplary preferred specialized object rendering functions of the system 50. FIG. 12A illustrates that an object or portion of an object, e.g., a left or right border of a selected object, can be repositioned horizontally within the duplicate image, either to the left or to the right depending upon whether the object to be rendered is to appear closer to the viewer or further away from the viewer in the projected or displayed 3-D image.

Figure 12B:
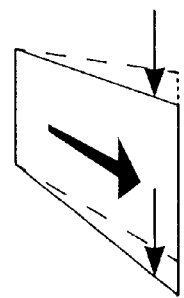

FIG. 12B illustrates that a selected object can be repositioned different amounts from one portion of the object to another. This "skew" rendering function is particularly well suited for creating an illusion of graduated, or linear, depth change from a near portion of the object to a far portion of the object as is desirable for the object 118 shown in FIG. 3H.

Figure 12C:
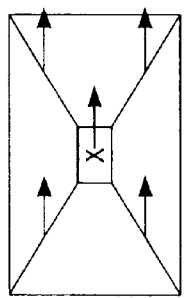

FIG. 12C illustrates that a "skew" can be applied to a plurality of different portions of a selected object to simulate, for example, a "bend" within the object. Similarly, FIG. 12H illustrates that a "corner push" object rendering function can be made available as a semi-automated tool which only requires that the user identify a predetermined group of boundaries within the object and specify ranges of horizontal repositioning distances, minimum and maximum numbers of pixels to be shifted, or the like.

Figure 12D:
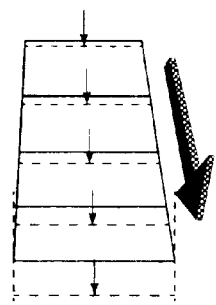

FIG. 12D illustrates a "stretch" object rendering function which is similar to the "position" function of FIG. 12A but instead stretches an object horizontally. The "stretch" function can be realized through pixel repeating or by extrapolating and expanding vertical columns of pixels depending upon the particular application.

Figure 12E:
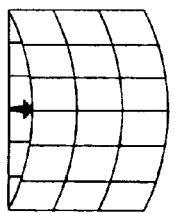
Figure 12F:
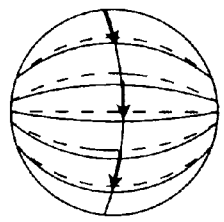
Figure 12G:
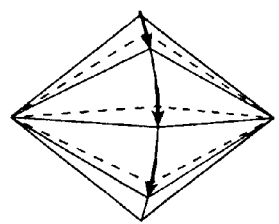
Figure 12H:
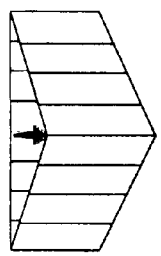

FIGS. 12E, 12F and 12G illustrate that more complex object rendering functions including sinusoidal or circular components can also be made available to the user. The "straight bulge" illustrated in FIG. 12E allows the user to apply, for example, a sinusoidal depth adjustment along a predetermined axis within the two-dimensional object to be repositioned. Although the bulge of FIG. 12E is about a vertical axis of the object, it should be understood that the aforementioned axis can also be horizontal or positioned at any other angle in between vertical and horizontal.

The "spherical bulge" of FIG. 12F is similar to the "straight bulge" of FIG. 12E but instead applies a depth adjustment to portions of the selected object according to a two-dimensional circular surface rendering function. The "cone bulge" of FIG. 12G applies both a circular function and a linear function to portions of the selected object to determine how each portion is to be repositioned. It should be understood that other object rendering functions than those explicitly disclosed herein are also contemplated as being within the scope of the present invention.

Figure 5:
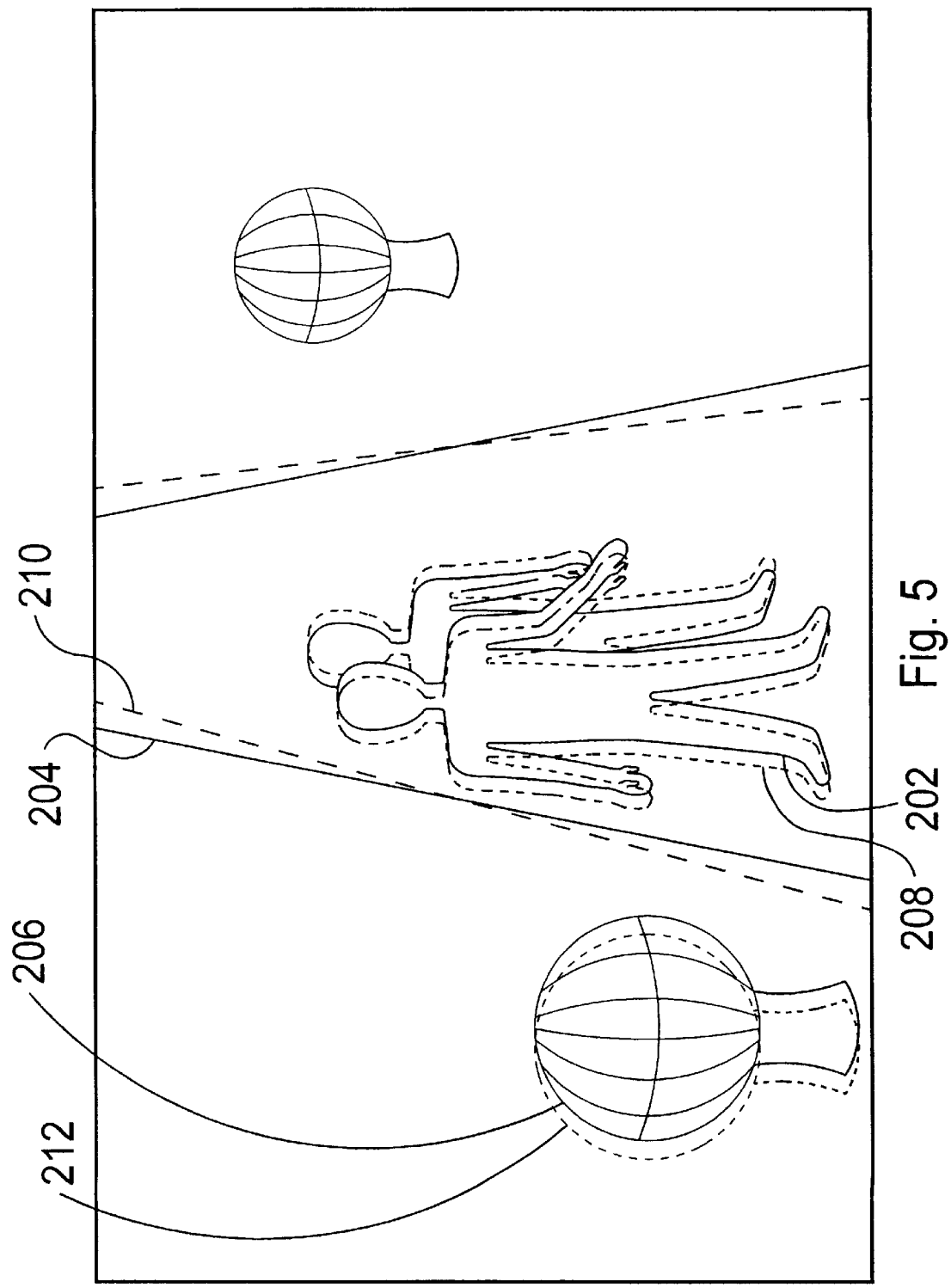
FIG. 5 illustrates how objects or portions of objects of a duplicated image are selected and displaced horizontally relative to an original image to form a complementary image.

FIG. 5 illustrates how objects or portions of objects of a duplicated image are selected and displaced horizontally relative to an original image to form a complementary image. FIG. 5 shows an original image and a duplicate of the original image that has been rendered into a complementary image superimposed over the original image. The original image includes an original fixed depth object 202, an original graduated depth object 204, and an original non-linear depth object 206. The complementary image includes a complementary fixed depth object 208, a complementary graduated depth object 210, and a complementary non-linear depth object 212. The complementary fixed depth object 208 is rendered by employing an object rendering function such as the "position" function of FIG. 12A. The complementary graduated depth object 210 is rendered by employing an object rendering function such as the "skew" function of FIG. 12B. The complementary non-linear depth object 212 is rendered by employing an object rendering function such as the "spherical bulge" function of FIG. 12F. Object 214 is positioned at mid-range distance and therefore its complementary object is superimposed directly over it.

Figure 4:
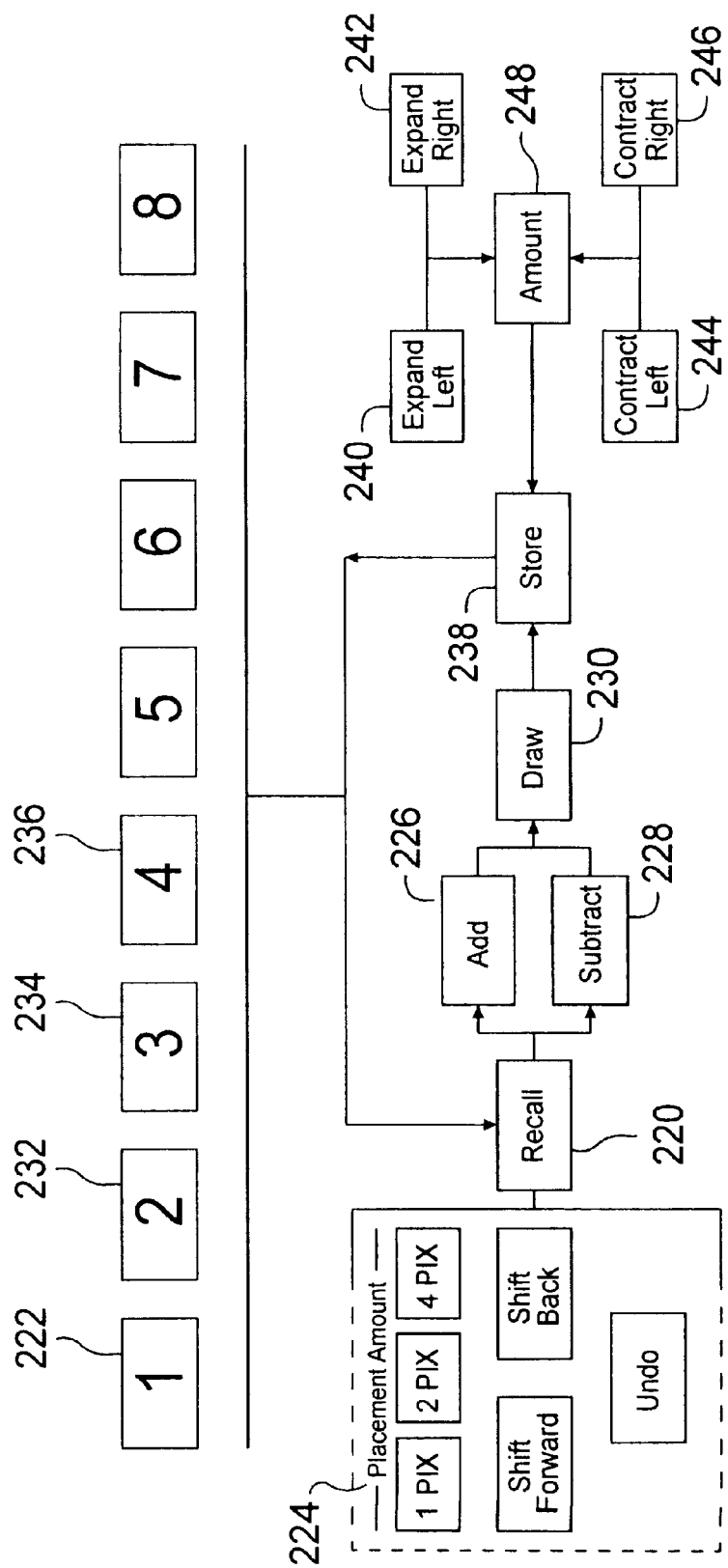
FIG. 4 is a simplified functional block diagram of the system for DIMENSIONALIZATION processing of images of FIG. 1.

FIG. 4 illustrates another key aspect of the present invention, namely, that the system 50 is adapted to allow the user to render a plurality of similar complementary images by recalling, and, as appropriate, adjusting object rendering information already established for a similar complementary image, typically within the same movie scene. FIG. 4 shows at recall block 220 that a previously rendered complementary object, e.g., from frame 222, is recalled from memory. At placement amount block 224, the user is provided with an interactive interface allowing the user to enter a desired placement amount. This designated placement amount is added or subtracted at blocks 226 and 228, respectively, and then drawn at block 230 to selected complementary image frames, e.g., frames 232, 234, 236. The drawn complementary object, if acceptable by the user who monitors the 3-D image at the result monitor 74, is then saved at block 238. If portions of the complementary object need additional positional adjustments, the expand left block 240, expand right block 242, contract left block 244, contract right block 246 and amount block 248 are employed as desired with the further adjustments to the resulting 3-D image being observed in real time.

Figure 6:
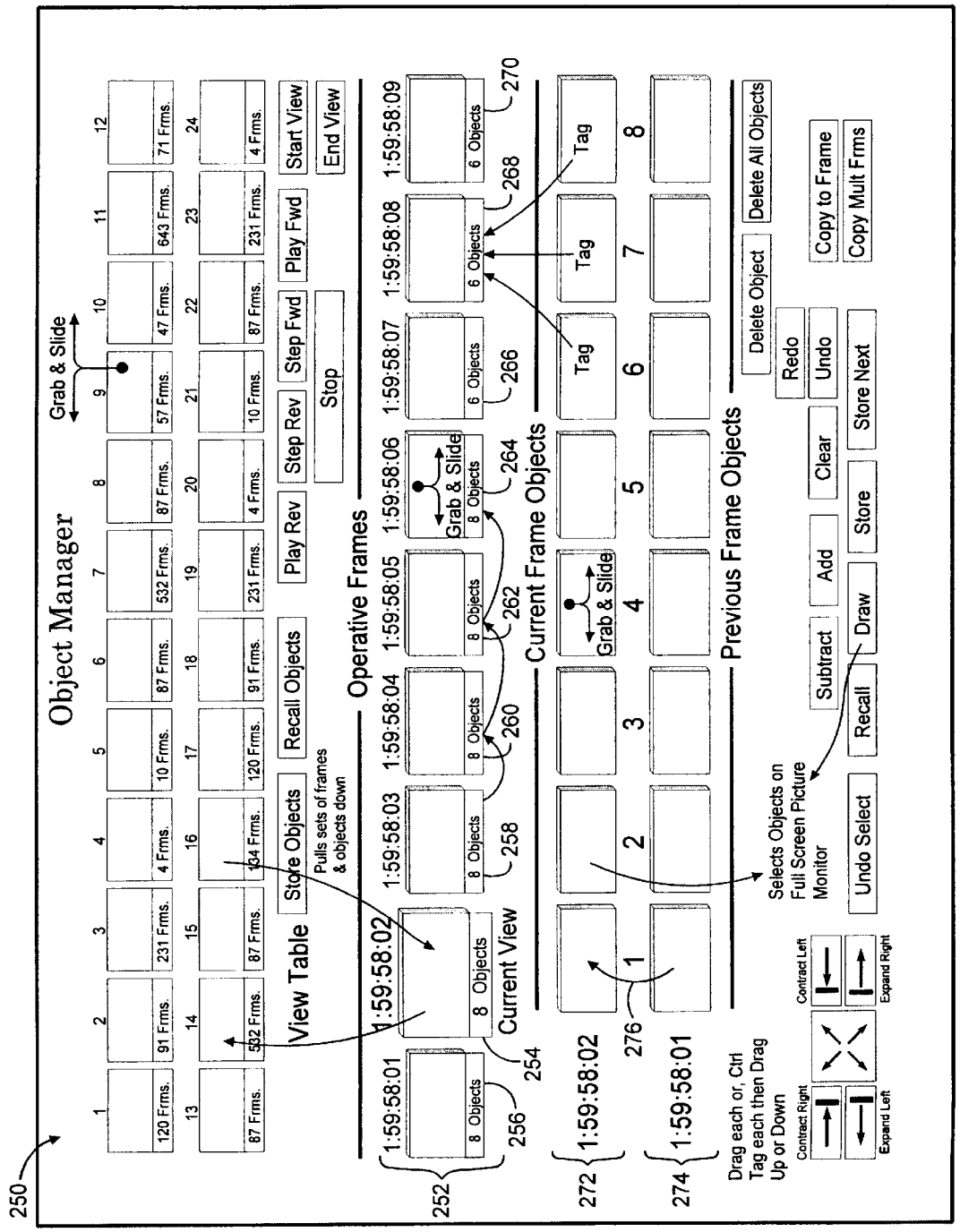
FIG. 6 shows an exemplary preferred embodiment of an Object Manager visual display of the system for DIMENSIONALIZATION processing of images of FIG. 1.

FIG. 6 shows an Object Manager visual display 250 of the system 50 which, in a preferred embodiment, is displayed on the control monitor 72. An operative frame portion 252 shows a current image 254, a previous image 256, and seven subsequent images 258, 260, 262, 264, 266, 268, 270. The Object Manager visual display 250 also includes a current frame objects portion 272 and a previous frame objects portion 274 which, in the illustrated example, show the objects of the current image 254 and the previous image 256, respectively. In copying previously rendered objects from one frame to another, the Object Manager visual display 250 allows the user to grab and slide objects from one image to another, e.g., as conceptually illustrated by arrow 276.

A View Table portion 278 allows the user to apply rendered objects of one group of images to another group even if the groups of images are not adjacent, such as in A/B cuts.

Figure 7:
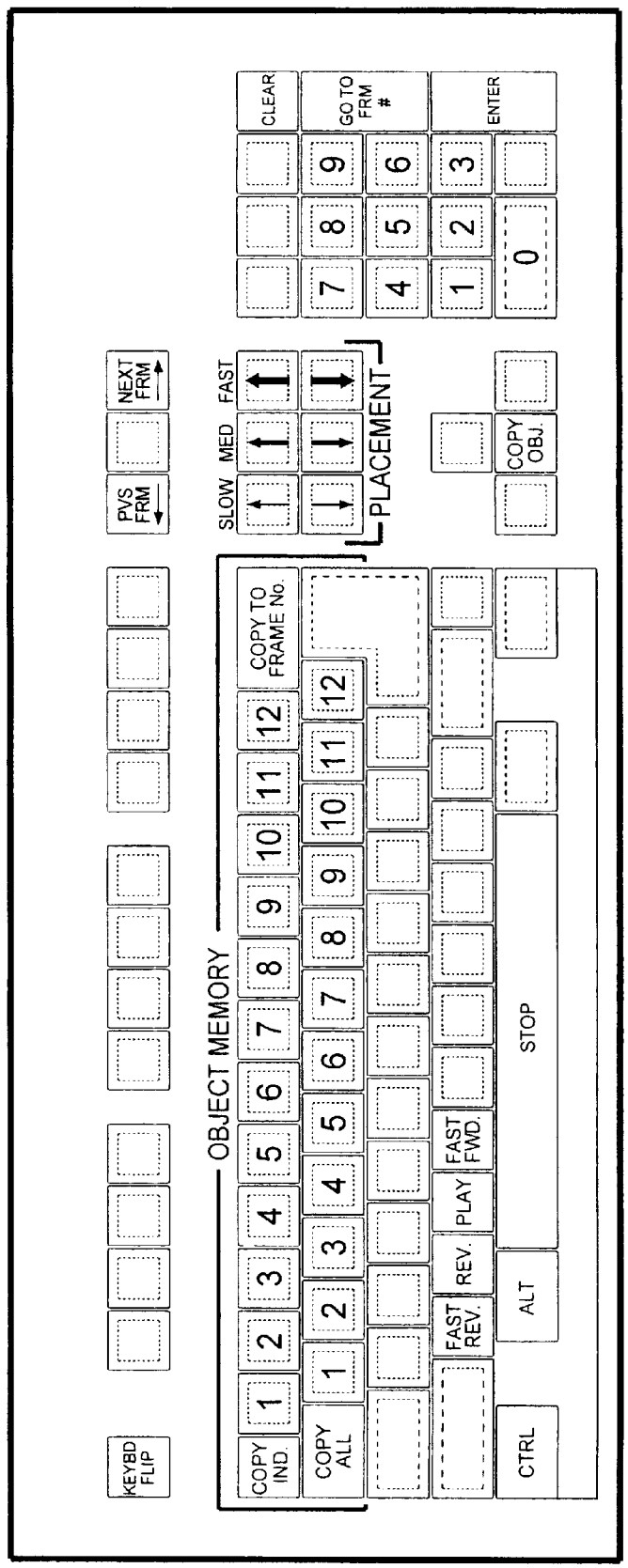
FIG. 7 shows a keyboard user input mechanism configured for system for DIMENSIONALIZATION processing of images of FIG. 1.

In a preferred embodiment, the Object Manager visual display 250 also includes an object manipulation portion 280 which provides a plurality of interactive on-screen user input mechanisms for manipulating objects to accommodate changes of position of an object within the frame due to a movement by the object, camera panning, etc. The user input mechanisms can alternatively be implemented via the keyboard 80 as shown in FIG. 7. It should be understood that the object manipulation portion 280 of the Object Manager visual display 250 can also be used in conjunction with the keyboard shown in FIG. 7 and that functions can be reallocated between the two as desired to accommodate particular applications. Exemplary preferred object manipulation capabilities provided by these user input mechanisms are discussed below.

Object Memory Control

Operative Frames

The Operative frames are displayed in a sequential order representing film frame running time elapsing from left to right. By having a series of frames displayed, one can, at a glance, see frames ahead of the current frame. The Current View frame is the frame that is the Operative frame and is displayed larger than the others. The Current View frame is also the frame that is displayed full screen on a separate monitor and is the frame that is to be drawn or modified.

The Operative Frame display may also slide to the left or to the right by grabbing and sliding with the tablet pen. Holding the control key while sliding the frames will cause the frames to keep moving at that same speed when the pen is lifted from the tablet. The Space Bar stops the display from moving.

Each frame has its associated frame number above it. Below each frame is the number of objects that are stored within that frame. Objects of one frame may be easily copied to another frame by grabbing and sliding the object window to another frame with the tablet pen. This will drag all of the objects in that frame to another. To clear all objects within a frame, the object window is highlighted by tapping with the pen, and then the delete key is pressed.

Current Frame Objects

There are multiple levels of randomly accessible memories for the purpose of quickly storing and recalling isolated sections, or subsections of objects or subjects in a frame. Each memory location saves the isolated object.

Previous Frame

When a frame is complete with all of the necessary objects or subjects stored for 3D placement, "NEXT FRAME" advances the current working film frame to the next working film frame. The CURRENT FRAME OBJECTS now move up to the PREVIOUS FRAME OBJECTS level, and the CURRENT FRAME OBJECTS is now available for storage of the new frame objects.

Previous Frame Objects

The objects relating to the frame prior to the current working frame are labeled as the Previous Frame Objects which are visually displayed (white over a black background) and are those objects that have been drawn around. Although there are 8 images showing the objects displayed at any one time, more than eight can be used by merely grabbing and sliding the tablet pen to the left.

Previous Frame

This function advances the frames backward one at a time. For example, if the current frame is sitting on frame number 1:59:58:02, then pressing Previous Frame will advance the current frame back to 1:59:58:01. The Operative Frame images will advance to the right or to the left accordingly with their respective frame numbers so that the Current View frame is the actual current frame. Additionally, the Current frame and Previous frame Objects will also advance accordingly.

2nd Level Memory

For ease of operation there are ten available randomly accessible switches for storing and recalling objects and subjects. Although there are much more than ten memory locations, ten switches are physically available on the front panel. The Second Level Memory switch causes switches one through ten to become eleven through twenty. At any time any number of Objects may be stored at any location by merely entering the location number on the keypad and pressing STORE.

Recall

The Recall function followed by the selection of an object number register (or by the number pad) automatically enables the Graphics Program to load (select) that selected object previously stored as a selectable user definable area around an object or subject.

Draw

The Draw function enables the Graphics Program to enter a drawing mode to allow the user to draw around objects and subjects within a picture frame. The Draw function may be for starting to draw an image from scratch, or to add to or remove from a previously drawn image. See Add and Subtract. When Draw is pressed a second time, the drawing function is released. If the Draw function is pressed again, it will be reset from zero.

Add

The Add function commands the graphics program to enter a mode whereby it allows additions to the previously drawn user defined regions.

Subtract

The Subtract function commands the graphics program to enter a mode whereby it allows previously drawn user defined regions to be subtracted, or removed from the original.

Relative Expand

This function commands the graphics program to expand the user-defined area by a predetermined number of pixels. This is useful for loosening up around tightly drawn objects.

Expand Left

If an object or subject is to be placed forward, toward the viewer, it will need to be positioned toward the left of the image. This may require a small amount of expansion only on the left side of the user defined (drawn) region. The reason for this is to keep the image from being cut off by the border itself. It is important not to increase the opposite side that the image is moving away from as this would tend to show a "border like" area of background attached to the object that has been moved forward.

Expand Right

If an object or subject is to be placed toward the back of an image, away from the viewer, it will need to be positioned toward the right of the image. This may require a small amount of expansion only on the right side of the user defined (drawn) region. The reason for this is to keep the image from being cut off by the boarder itself. It is important not to increase the opposite side that the image is moving away from as it would tend to show a "border like" area of background attached to the object that has been moved backward.

Contract Left

If a drawn region needs to be tightened up toward the object, Contract Left instructs the graphics program to move the right side of the drawn border to the left of the selected border.

Contract Right

If a drawn region needs to be tightened up toward the object, Contract right instructs the graphics program to move the left side of the drawn border to the right of the selected border.

Undo

The Undo command causes the system to "undo", or "backup" to, the previous state.

Redo

The Redo command causes the system to move ahead to the last set of commands.

Store

When an object or subject is finished being isolated, Store is pressed which commands the graphics software to step through a series of functions. The selected areas are saved with an automatic instruction to save as a new selection such as is provided in Adobe Photoshop. Next, the image is saved as a .PST file with an assigned sequence of numbers. After the image has been saved, the same image is immediately opened in the image database to immediately display the selected objects for that register number. The selected objects of the image will appear in the database or tool display as white over a black background. An alternate mode is to display the selected objects in color surrounded by black outside of the isolated areas. It should be noted that if the image has been altered and re-saved, the routine is basically the same and the database refreshes the opening of the same image that was just adjusted. The selected objects or subjects are only stored for that particular frame number of that one image.

Store Next

Store Next automatically stores the selected objects in the next available unused location without the need to enter a specific numbered location.

Copy Individual

Objects may be copied from the previous frame to the current frame by merely dragging the Object frame to the Current Object frame, or by pressing Copy Individual on the keyboard and selecting the object memory location and transferring it to the current frame by pressing one of the current frame registers.

Copy Mult

When Copy Mult is pressed, one or more object selections may be tagged. When pressed again, they are copied to the current location bus.

Copy All

This is a quick way to copy all of the Objects from one frame to the next. This is accomplished by either pressing the Copy All button on the keyboard, or pressing Control C on the keyboard and then dragging any of the previous frame objects down to the Current frame objects.

Copy to Frame

Selected Objects may be copied to any frame by pressing "Copy to Frame" and then the frame number to which that selection is to be copied to.

Figure 8:
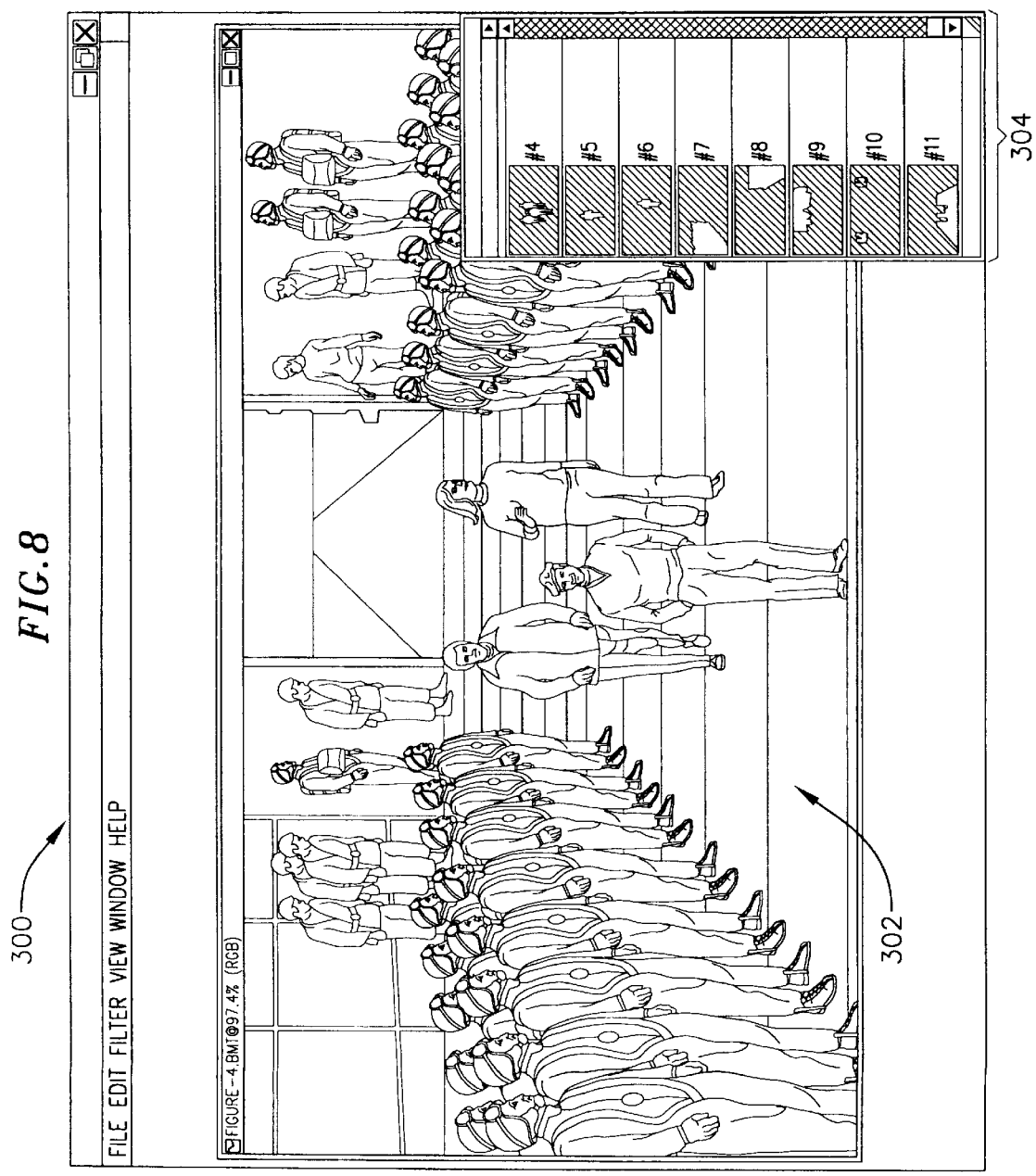
FIG. 8 shows an exemplary preferred embodiment of an visual display of the system for DIMENSIONALIZATION processing of images of FIG. 1 including an image region and an object region.

Another key aspect of the present invention is that the processor 56 is adapted or programmed to generate visual display control signals such that the visual displays at the monitors 72, 74, 76 includes a plurality of image regions depending upon the stage of the DIMENSIONALIZATION process and the preferences of the user. These image regions include original image regions, duplicate image regions, complementary image regions, 3-D image regions, and object regions in various combinations. For example, and as illustrated in FIG. 8, visual display 300 includes an image region 302 which can show an original image, duplicate image, complementary image, or 3-D image region as desired. The visual display 300 of FIG. 8 also includes an object region 304 with sub-regions that individually show the selected objects in image region 302. Preferably, the selected objects are shown in outline only, or in silhouette or reverse silhouette.

Figure 9:
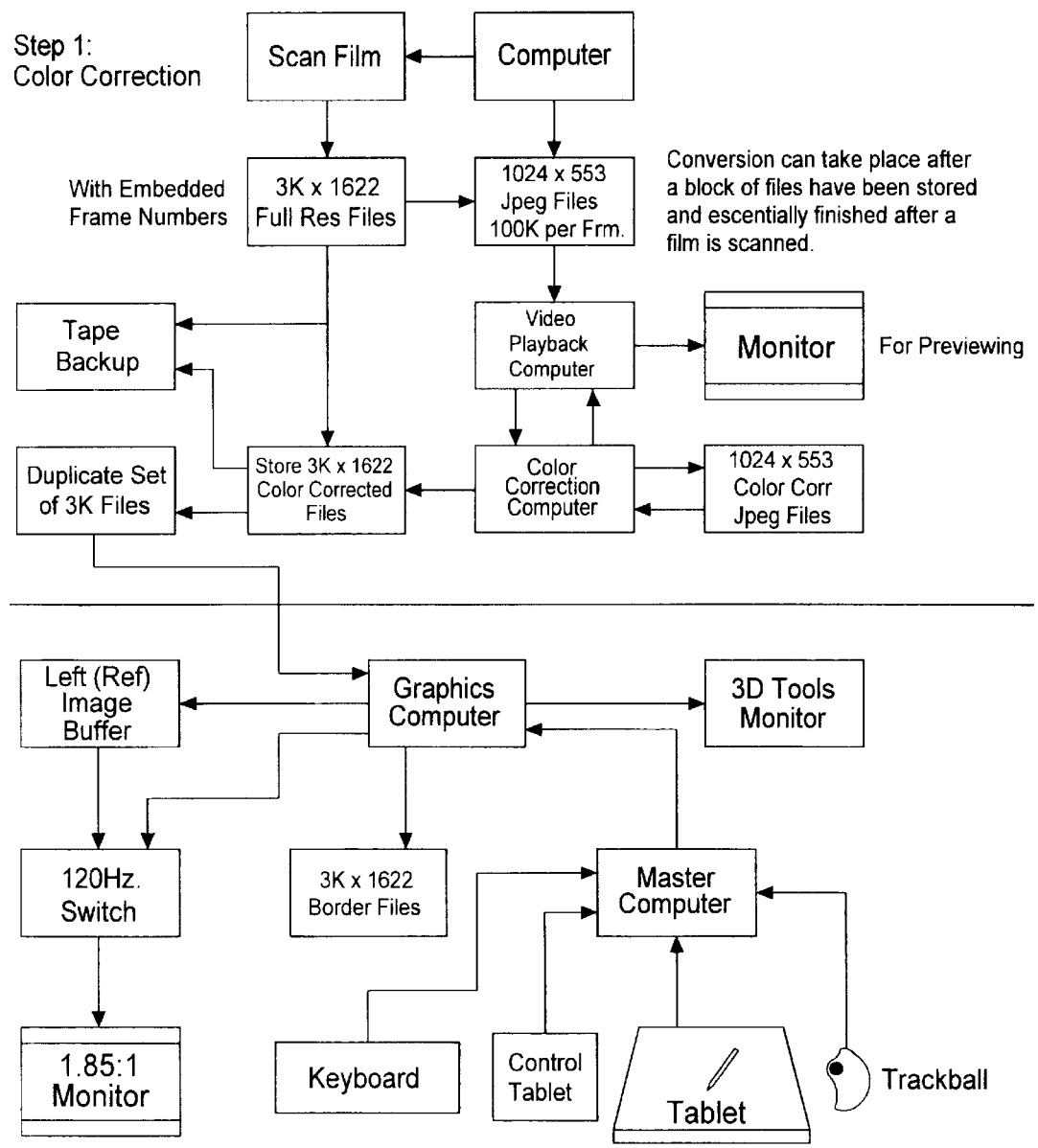
FIG. 9 is a functional block diagram of color correction according to an exemplary preferred embodiment of the system for DIMENSIONALIZATION processing of images of FIG. 1.

FIG. 9 is a functional block diagram of a color correction processing step implemented by an exemplary preferred embodiment of the system 50.

Each frame that makes up the motion picture image has been scanned and stored in a high-density digital storage system. The images must be color corrected prior to the separation of images for three-dimensional rendering. Color correction is accomplished by the use of both hardware and software. Color correction with this process is sped up by performing the corrections on the lower resolution images while recording the parameters and translating those parameters, applying the correction decisions to the high-resolution images. In this way the processing time may be deferred and automatically carried out on the high-resolution images while the operator is busy color correcting the next scene or scenes.

Color correction involves changing the color balance of each scene. Color balance is whereby the red, green, and blue whole components that make up the full color image are varied in linear and non-linear amounts. Color balance typically involves adjustment of the blacks or low light areas of an image, the gammas or mid gray areas, and the whites or highlight areas of an image. Each of the red, green, and blue components has its own blacks, gammas, and highlights varies. The Dimensionalize system makes use of color correction tools which are part of present day graphic programs such as Adobe Photoshop and the like. Selectable area color correction is made use of within these graphic programs if necessary by defining, or drawing around particular areas of an image and applying color correction parameters to those selected areas. Although selectable area color correction may be useful, it is used only when necessary as it slows down the entire color correction process.

As part of the Dimensionalize Process, all color correction tools within the operated graphics software may be utilized and therefore instructed by the primary computer to execute commands, or a series of commands upon a batch, series, or entire sequence of images. This will aid to speeding up the process.

The color correction parameters, or the instructions for color corrections used to color correct a series of images, may be carried out on high resolution images after the color correction decisions have been determined and stored using lower resolution images. This is another way in which the processing time may be reduced significantly.

Figure 10:
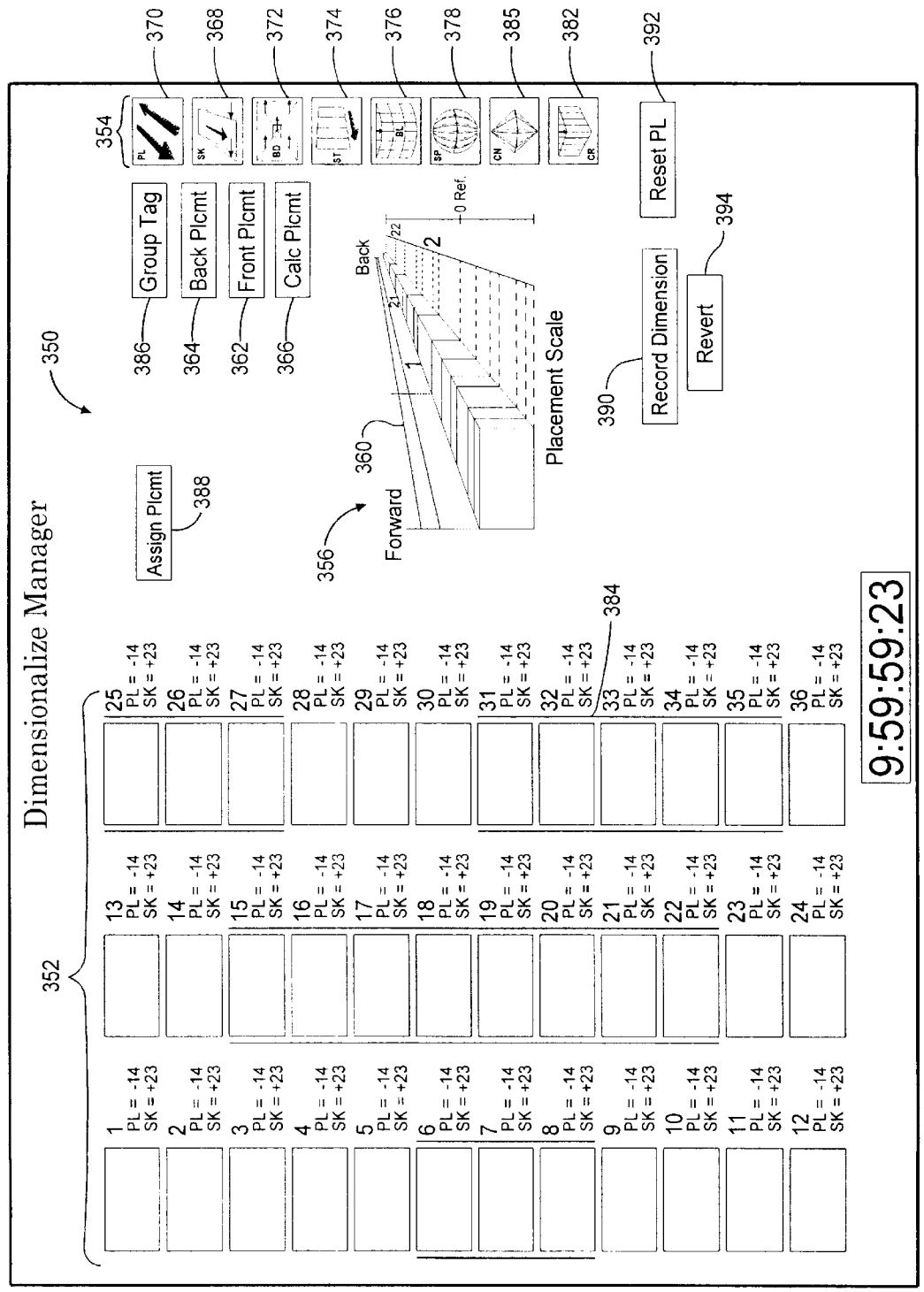
FIG. 10 shows an exemplary preferred embodiment of a Dimensionalize Manager visual display of the system for DIMENSIONALIZATION processing of images of FIG. 1.

FIG. 10 shows an exemplary preferred embodiment of a Dimensionalize Manager visual display 350 of the system 50. Generally, the Dimensionalize Manager visual display 350 provides an interface through which the user applies object rendering functions to selected objects. While the Dimensionalize Manager visual display 350 is shown separately from the Object Manager visual display 250 of FIG. 7, it should be understood that the system features made available to the user through these displays can be presented through a single visual display or through additional visual displays depending upon the particular nature of the system and its intended applications.

The Dimensionalize Manager visual display 350 is controlled by the processor 56 and, in a preferred embodiment, is provided at the control monitor 72 or the library monitor 74. The Dimensionalize Manager visual display 350 is used in conjunction with the keyboard 80 and the trackball or mouse 82 and also includes an object display portion 352, an object rendering function activation portion 354, and an interactive graphic portion 356 adapted to prompt the user to provide inputs depending upon which object rendering function has been selected. In exemplary FIG. 10, a placement icon 358 has been activated by the mouse 82 or otherwise. In response, the processor 56 has generated visual display control signals resulting in the presentation of an interactive graphic portion 356 which prompts the user to provide inputs needed by the object rendering function "skew", previously discussed with reference to FIG. 12B. In operation, the user positions a screen cursor, or the like, along a placement bar 360 of the interactive graphic portion 356. For an object being rendered, once the placement of the front of the object has been selected along the placement bar 360, the user actuates a front placement button 362 shown on the Dimensionalize Manager visual display 350. Similarly, once the placement of the back of the object has been selected along the placement bar 360, the user actuates a back placement button 364. Once the front and back of an object have been assigned placement values, a calculate placement button 366 is actuated by the user. In response, the processor 56 calculates the placement of all points in between the front and back of the selected object according to the "skew" object rendering function.

The interactive graphic portion 356 discussed in the preceding paragraph is presented to the user after the skew icon 368 is selected. It should be understood that a different interactive graphic portion 356 is presented for each of the object rendering functions, "position", "bend", "stretch", "straight bulge", "spherical bulge", "cone bulge", and "corner push" when the position icon 370, bend icon 372, stretch icon 374, straight bulge icon 376, spherical bulge icon 378, cone bulge icon 380, and corner push icon 382 shown in FIG. 10 are respectively selected.

Another key feature of the present invention is that the Dimensionalize Manager visual display 350 allows the user to select a group of frames, as indicated by group selection indicia 384, and tag the selected group by selecting a group tag button 386. An assign placement button 388 is actuated by the user to apply a skew rendering function, with front and back placement values provided by the user, to the selected object of one frame or the selected objects of a plurality of frames.

Additional features of the Dimensionalize Manager visual display 350 include a record dimension button 390, a reset placement button 392, and a revert button 394. By way of example, the record dimension button 390 is employed to store an object rendering function with particular user input values. The reset placement button 392 is used to reset the various parameters of an object rendering function to a predetermined set of start parameters. The revert button 394 reverts the rendering of an object to a previous rendering. It should be understood that the aforementioned buttons can alternatively be provided at the keyboard 80 rather than in the Dimensionalize Manager visual display 350.

Figure 11:
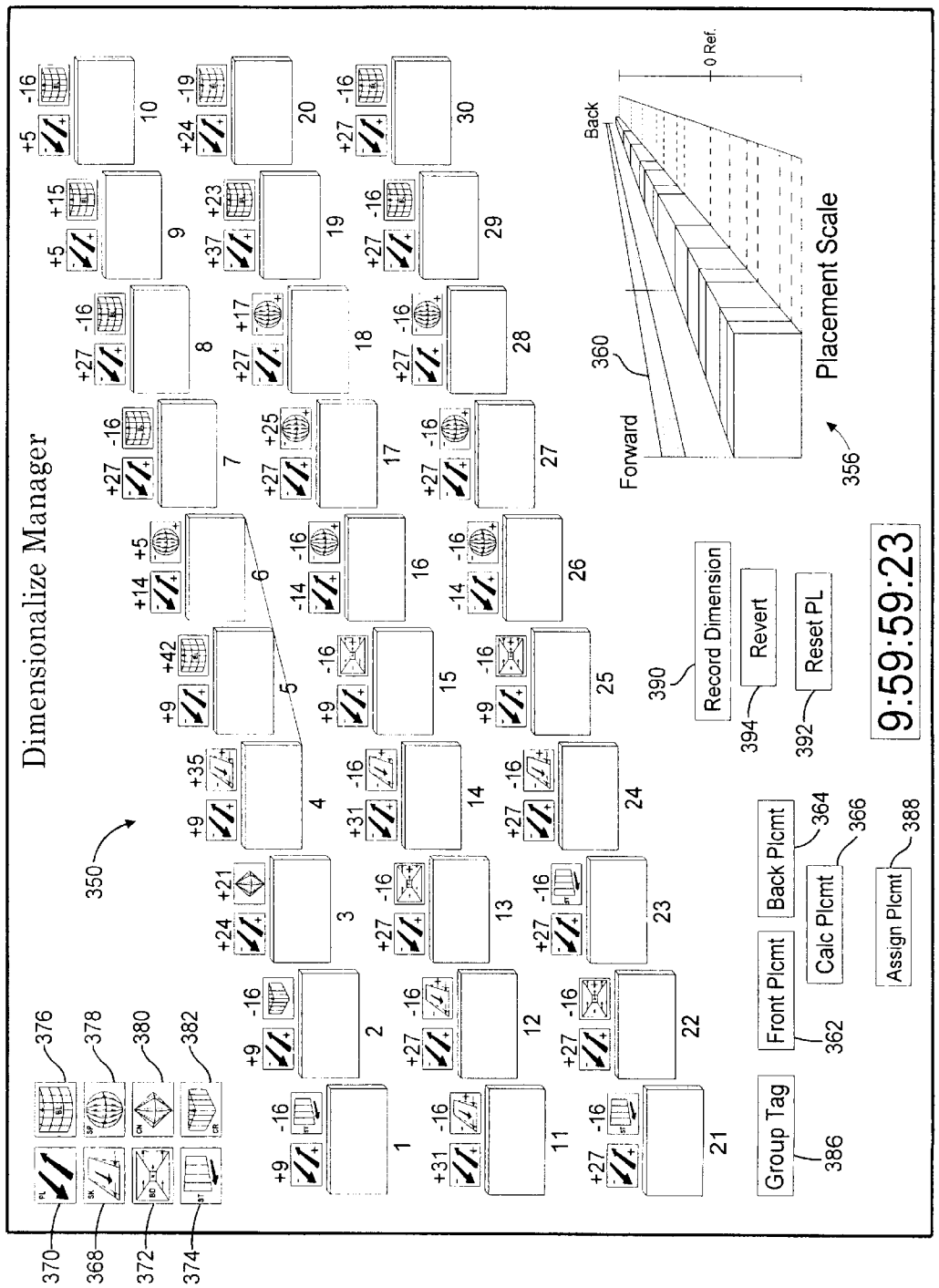
FIG. 11 shows another exemplary preferred embodiment of a Dimensionalize Manager visual display of the system for DIMENSIONALIZATION processing of images of FIG. 1.

FIG. 11 shows another exemplary preferred embodiment of a Dimensionalize Manager visual display 350'. The elements of the display 350' are the same as the elements of the display 350 of FIG. 10 except that icons are employed to indicate which object rendering functions have been applied to which objects and the buttons, regions and graphics have been rearranged in position within the visual display 350'.

Speed Advantages to the Object Manager

1. The ability to assign front to back placement values over a number of frames.
2. The ability to assign areas around objects and subjects to cause a dissolve to occur between two or more depth placement values or algorithms to eliminate the appearance of hard cutout effects where necessary.
3. The ability to be able to grab objects and move them from one frame to another.
4. The ability to advance a picture frame but retain the previous object selections.
5. The ability to automatically overlay images and to see edge selection differences.
6. The ability to be able to tag objects of an image and copy them to other frames or frame spaces.
7. The ability to quickly tag frames as a View and store in a scratch pad memory displaying the 1st frame of the View on the monitor.
8. The ability to quickly copy objects or all objects from one from to another with just a single function.
9. The ability to visually see at a glance multiple views and the number of frames that make up that view.
10. The ability to tag by dragging a series of frames into one view window so that objects may be easily applied to all the frames that make up that view.
11. The ability to quickly copy View objects to other Views.
12. The ability to have multiple computers simultaneously process time consuming algorithms and batch files while at the same time making changes progressing the multi-step process. In this way time is significantly reduced by virtue of being able to make changes while another computer is processing the last set of commands.

Speed Advantages of Dimensionalizing

1. The ability to record positional values without actually processing them.
2. The ability to "Point and Grab" and pull forward or push back objects while viewing them in real time, i.e., "Depth-at-a-Glance™".
3. The ability to quickly assign, or draw an area where a gradual change, or dissolve will occur between the depth value of an object, or an area of an object, to its adjacent depth value.

4. The ability to place an object in depth and immediately undo a depth placement if necessary and start over.
5. The ability to relate positional moves in pixels to the dimensional log.
6. The ability to assign those confirmed dimensions to their associated View Frames.
7. The ability to quickly assign a "Linear Depth Algorithm" to selected objects.
8. The ability to assign at a glance, by selecting icons, depth algorithms such as spherical dimensions or skews to objects.
9. The ability to immediately preview and play through previously stored 3D renderings while viewing in 3D in real time or in variable speeds.

Referring back to FIG. 1, another key aspect of the present invention is that the film recorder 62 is provided with data such that both the left and right images of the 3-D stereo pair are recorded on a single pull down frame of film or within the space of a single frame, i.e., frame space. Furthermore, the left or original images are each positioned within the frame or frame space such that the motion picture could also be projected in 2-D with a standard motion picture projector. Such compatibility with standard motion picture projectors is achieved by compressing the corresponding right or complementary frames within the same pull down frame or frame space. Thus, rather than exposing the film twice, once for the left frame and once for the compressed right frame, it is more accurate and less time consuming to employ the film recorder 62 to record the two images together (one above the other) as if it were one frame. Although the vertical resolution of the film recorder will need to be greater because of the stacked images, there is an electronic advantage to adding enhancements and color correction to the entire new stereo image. If only the right image is enhanced, left/right 3-D stereo disparities may occur. Although the foregoing paragraph refers to compression of a corresponding right or complementary frame, it should be understood that the 3-D information can include multiple perspective views within a single frame or frame space.

Figure 16:
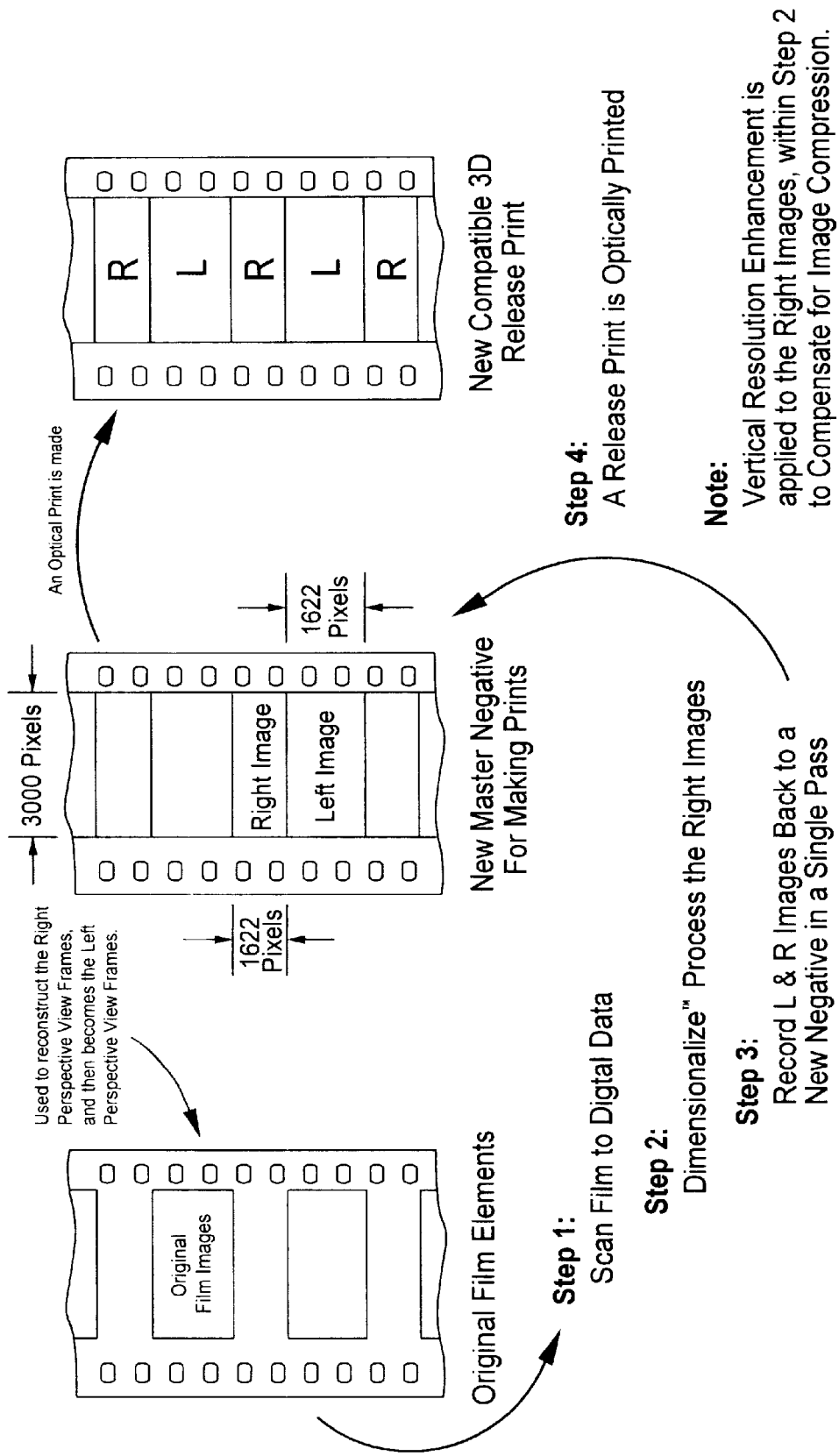
FIG. 16 illustrates a preferred method of recording a 3-D release print according to the present invention wherein the left and right images are sequentially recorded on a master negative in a single pass.

Another advantage of employing the film recorder 62 to record the two images together is that it eliminates any possibility of a mismatch of left and right frames. In other words, if the left and right images are recorded separately in two passes, extreme care must be taken to guarantee that the left and right image pairs are from the exact same frame, otherwise, the entire film roll would be wasted and have to be re-recorded. Although a preferred method employs the film recorder 62 to record the two images simultaneously, it should be understood the scope of the present invention also includes a method of creating a master negative as shown in FIG. 16 wherein the left and right images are sequentially recorded in a single pass.

35 mm Projection 35 mm motion picture film is such that the image occupies an area between 4 perforations (or perfs) top to bottom and across from perf to perf for each individual film frame. The term "full camera aperture" refers to the maximum possible picture area within the four-perf film frame. Full camera aperture dimensions is primarily used in the photography stage of filming so that the camera takes advantage of exposing as much film area as possible for the benefit of increased resolution and the minimum amount of film grain.

35 mm projection formats, otherwise known as release prints, are slightly different in that image sizes are reduced to make room for an optical sound track, which runs the length of the film. The sound track occupies a width area of 0.112". The sound track area therefore shifts the actual film center reference point re-establishing it to what is referred to as "Academy Center". The academy center is the new image center reference.

To maintain a 1.85 to 1 aspect ratio, the image is reduced to 0.825" wide by 0.446" high as shown in FIG. 13. Although there are digital audio formats that derive their audio information other than from the film, the optical track is still necessary for redundancy in the case of failure of the digital system. Therefore, the traditional analog optical audio track must remain on the film.

The two most common projection formats for 35 mm film are 1.85 to 1 and Cinemascope.

1.85 to 1 Projection

The most common 35 mm-projection format for cinematic features is 1.85 to 1. This simply means that the aspect ratio of the image form left to right is 1.85 times the height. With the image only occupying 0.446" of height out of the available 0.735", only 60% of the film area is used. The image on a 1.85 print is projected with high magnification, and 1 to 1 aspect ratio to a projection screen that may be in excess of 35 feet across. Still, the image in this format maintains its 1.85 to 1 aspect ratio.

Cinemascope Projection

Cinemascope is a film format with a wider aspect ratio of 2.35 to 1. Cinemascope uses the entire full aperture height of 0.735" and anamorphically compresses the width of the image down to the academy width dimensions. The advantage of the Cinemascope format is that the image occupies more film area resulting in slightly better resolution. A special Cinemascope lens must be used to photograph the images in this wide screen format. Conversely, special Cinemascope anamorphic lenses must be used on the projector for projecting in this format.

Stereoscopic Alternate Image Projection

A key aspect of the present invention is optically coding and decoding alternate image information into unused space of a conventional film frame format. A variety of different projection formats of coding alternate image information within each film frame in addition to the original image for the purpose of obtaining two images within the same frame space can be employed and preferred exemplary image projection formats are discussed below.

Format A, the Compressed Alternate Frame

Referring to FIG. 14, Format A is the most preferred format for compatibility. Each film frame contains the conventional 1.85 to 1 academy projection frame along with an additional frame that is vertically compressed down within the normally unused area of the film. The alternate image frame occupies an area of 0.302" in image height, but has the same width of the standard 0.825" frame. Format A requires an optical decoding system wherein the alternate image information is separated from the standard image area and optically stretched back to the same height as the standard frame. Another alternative within the scope of the preferred compressed frame format is to optically reduce the entire image, non-anamorphically, in which the aspect ratio is maintained. Additionally, the standard image area requires its optical path to be brought to the same focal plane prior to the projection lens. The tremendous advantage of the compressed frame Stereoscopic format A is the fact that the same film that contains the additional double picture information can be projected on projectors that have no modification for decoding. This is because the standard frame occupies the same area as a conventional 1.85 to 1 release print and the alternate frame occupies normally unused areas of the film. Therefore, there needs to be only one release print that will work for all projectors.

Format B, 1.85:1-V

Referring to FIG. 15, Format B provides that each full aperture film frame contains two discrete images that are rotated 90 degrees placing the left to right dimension of the image lengthwise on the film. The dimension of each frame is 0.735" by 0.397", for example, and, with both frames, still allows for the conventional optical track. Between the two frames, there is a guard band area of 0.02987", for example, that may be used for coding special information or data such as Registrip™ (film registration information). Format B is configured such that each of the two image frames is only 11% smaller than the conventional 1.85 to 1 frame. Yet, with only a 11% reduction in frame size, an additional frame is obtained. The image may be anamorphically expanded in order to obtain greater than 1.85 to 1 aspect ratios such as 2.35 to 1, as with Cinemascope wide screen formats. An advantage of Format B is that it does not require split optical focal length paths in order to present both images to the screen in identical sizes as both images are symmetrical.

Those skilled in the art will appreciate that various adaptations and modifications of the just described preferred embodiment can be configured without departing from the scope and spirit of the invention. Thus, by way of example and not of limitation, the compressed frame format discussed herein can also be used to double the number of frames per second at which two-dimensional films are projected. Rather than provide stereo pairs of images for three-dimensional projection within each pull down frame or frame space, two images—each projected at a different time—can be provided within each pull down frame or frame space. Therefore, it is to be understood that, within the scope of the appended claims, the invention may be practiced other than as specifically described herein.

I claim:

1. A system for converting two-dimensional images into three-dimensional images, the system comprising:

an image monitor adapted to generate visual displays in response to visual display control signals; and a processor adapted to generate the visual display control signals such that the visual displays prompt a user of the system to provide user inputs pertaining to an original image and selected objects within a copy of the original image, and to render a complementary image including complementary objects with pixels of the complementary objects being horizontally repositioned within the complementary image as compared to positions of the selected objects within the original image;

wherein the original image is retained and the processor is adapted to provide the original image in conjunction with the complementary image such that the original image and the complementary image make up a pair of images of a three-dimensional stereoscopic image.

2. The system for converting two-dimensional images into three-dimensional images of claim 1 wherein:

the processor is adapted to generate the visual display control signals such that the image monitor shows the original image and the complementary image after at least one of the complementary objects within the complementary image is repositioned horizontally.

3. The system for converting two-dimensional images into three-dimensional images of claim 1 wherein:

the processor is adapted to generate the visual display control signals such that the image monitor alternately shows the original image and the complementary image as one of the complementary objects within the complementary image is horizontally repositioned.

4. The system for converting two-dimensional images into three-dimensional images of claim 1 wherein:

the processor is adapted to generate the visual display control signals such that the visual displays include a plurality of regions including an original image region and a complementary image region.

5. The system for converting two-dimensional images into three-dimensional images of claim 4 wherein:

the processor is adapted to generate the visual display control signals such that the original image region and the complementary image region show a sequence of original images and a sequence of complementary images, respectively.

6. The system for converting two-dimensional images into three-dimensional images of claim 1 wherein:

the processor is adapted to generate the visual display control signals such that the visual displays include a plurality of regions including an image region and an object region, and to generate the visual display control signals such that the image region shows the original image or the complementary image, and the object region shows the selected objects or silhouettes of the selected objects.

7. The system for converting two-dimensional images into three-dimensional images of claim 1 wherein:

the processor is electrically connected to a memory device and is adapted to generate the visual display control signals such that the visual displays provide an interactive interface through which the user of the system can outline the selected objects to create object outlines, and to store the selected objects and the object outlines in the memory device.

8. The system for converting two-dimensional images into three-dimensional images of claim 7 wherein:

the processor is adapted to copy the object outlines from one frame to multiple frames.

9. The system for converting two-dimensional images into three-dimensional images of claim 1 wherein:

the processor is adapted to generate the visual display control signals such that the visual displays provide an interactive interface through which the user of the system can copy any of the complementary objects to a plurality of complementary images.

10. The system for converting two-dimensional images into three-dimensional images of claim 1 wherein:

the processor is adapted to generate the visual display control signals such that the visual displays provide an interactive interface through which the user of the system can associate depth placement assignments with the selected objects, and to reposition pixels of the complementary objects within the complementary image depending upon the depth placement assignments.

11. The system for converting two-dimensional images into three-dimensional images of claim 9 wherein:

the processor is electrically connected to a memory device and is adapted to store the depth placement assignments in the memory device.

12. The system for converting two-dimensional images into three-dimensional images of claim 9 wherein:

the processor is adapted to generate the visual display control signals such that the visual displays provide an interactive interface through which the user of the system can associate the depth placement assignments with a plurality of selected objects.

13. The system for converting two-dimensional images into three-dimensional images of claim 9 wherein:

the processor is adapted to copy the depth placement assignments from one frame to multiple frames.

14. The system for converting two-dimensional images into three-dimensional images of claim 1 wherein:

the processor is adapted to generate the visual display control signals such that the visual displays provide an interactive interface through which the user of the system can associate a predetermined object rendering function with the selected objects, and to reposition pixels of the complementary objects within the complementary image depending upon the object rendering function.

15. The system for converting two-dimensional images into three-dimensional images of claim 14 wherein:

the object rendering function comprises a linear function.

16. The system for converting two-dimensional images into three-dimensional images of claim 14 wherein:

the object rendering function comprises a non-linear function.

17. The system for converting two-dimensional images into three-dimensional images of claim 14 wherein:

the object rendering function comprises a sinusoidal function.

18. The system for converting two-dimensional images into three-dimensional images of claim 1 wherein:

the processor is adapted to generate recorder data pertaining to the original image and the complementary image, the data being in a form usable by a device for recording the original image and the complementary image in consideration of an image projection format.

19. The system for converting two-dimensional images into three-dimensional images of claim 18 wherein:

film printed according to the image projection format is suitable for projection on a motion picture projector configured to project 35 mm, 65 mm or 70 mm motion picture film.

20. The system for converting two-dimensional images into three-dimensional images of claim 18 wherein:

the image projection format provides that the original image and at least a portion of the complementary image are positioned within a single frame of film.

21. The system for converting two-dimensional images into three-dimensional images of claim 20 wherein:

the at least a portion of the complementary image is compressed.

22. The system for converting two-dimensional images into three-dimensional images of claim 18 wherein:

the image projection format provides that a first sequence of original images is positioned on a film such that the original images can be projected by a motion picture projector configured to project motion picture film and that a second sequence of complementary images is positioned on portions of the film not occupied by the first sequence of original images.

23. A system for converting two-dimensional images into three-dimensional images, the system comprising:

a data storage device upon which is stored a computer-executable program which when executed by a processor in electronic communication with an image monitor controls the processor to generate and provide visual display control signals to the image monitor such that the image monitor generates visual displays that prompt a user of the system to provide user inputs pertaining to an original image of a motion picture sequence and a selected object within the original image, render, in response to the user inputs, a complementary image from the original image, the complementary image including a complementary object with at least a portion of the complementary object being repositioned horizontally within the complementary image as compared to a position of the selected object within the original image, and provide the original image in conjunction with the complementary image such that the original image and the complementary image make up a pair of images of a three-dimensional stereoscopic image.

24. A method for converting two-dimensional images into three-dimensional images, the method comprising the steps of:

providing an interactive video interface through which an operator can select objects within a copy of an original image and apply values generated by object rendering functions to the objects;

rendering a complementary image identical to the original image except that portions of the objects are translated in position depending upon the object rendering function applied;

employing the interactive video interface in conjunction with a viewing device for providing images to the left eye and the right eye of the operator to view the original image with one eye and the complementary image with the other eye in real time as one of the object rendering functions is applied to at least one of the objects within the complementary image; and recording the original image and the complementary image onto a storage medium such that the original image and the complementary image make up a pair of images of a three-dimensional stereoscopic image.

25. The method for converting two-dimensional images into three-dimensional images of claim 22, further comprising the step of:

employing the interactive video interface to isolate objects within images and log associations between the objects and particular images.

26. The method for converting two-dimensional images into three-dimensional images of claim 22, further comprising the step of:

employing the interactive video interface to define and store an area of at least one image and to make the area available to be selected subsequently.

27. The method for converting two-dimensional images into three-dimensional images of claim 22, further comprising the step of:

employing the interactive video interface to generate and store a high contrast image from a defined area of at least one image and to make the high contrast image available to be selected subsequently.

28. The method for converting two-dimensional images into three-dimensional images of claim 22, the method further comprising the step of:

color correcting the original image and translating color correction parameters to a higher resolution image corresponding to the original image.

29. A method for converting two-dimensional images into three-dimensional images, the method comprising the steps of:

identifying objects within a series of images of a motion picture, the series of images being suitable for two-dimensional viewing of the motion picture;

applying depth placement values over a selected plurality of pixels of the images that include the objects, with the depth placement values varying over the selected plurality of pixels for a succession of the images; and employing the series of images and the depth placement values to generate a complementary series of images, the series of images and the complementary series of images providing a series of three-dimensional images.

30. A method for generating three-dimensional images, the method comprising the steps of:

receiving picture information for a sequence of original images from a motion picture and a sequence of complementary images, the original images including objects and the complementary images including complementary objects, each of the complementary images being made from picture information for one of the original images with pixels of the complementary objects being horizontally repositioned within the complementary image as compared to positions of the objects within the original images, the sequence of original images and the sequence of complementary images making up stereo pairs for a sequence of three-dimensional images; and employing the picture information to generate the sequence of original images and the sequence of complementary images for viewing the sequence of three-dimensional images.

* * * * *

UNITED STATES PATENT AND TRADEMARK OFFICE
CERTIFICATE OF CORRECTION

PATENT NO. : 6,208,348 B1
DATED : March 27, 2001
INVENTOR(S) : Michael C. Kaye

It is certified that error appears in the above-identified patent and that said Letters Patent is hereby corrected as shown below:

<u>Title page,</u>
Item [54] should read as follows:
-- System and Method for Converting Two-Dimensional Images into Three-Dimensional Images --.

Signed and Sealed this

Twenty-eighth Day of August, 2001

Attest:

*Nicholas P. Godici*

*Attesting Officer*

NICHOLAS P. GODICI
*Acting Director of the United States Patent and Trademark Office*